US008651386B2

(12) United States Patent
Hepner et al.

(10) Patent No.: US 8,651,386 B2
(45) Date of Patent: Feb. 18, 2014

(54) ELECTRONIC CARD AND METHOD FOR GENERATING A MAGNETIC FIELD FROM SWIPING THE ELECTRONIC CARD THROUGH A CARD READER

(75) Inventors: David F. Hepner, San Jose, CA (US); Wayne I. Imaino, San Jose, CA (US); Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 12/613,751

(22) Filed: Nov. 6, 2009

(65) Prior Publication Data

US 2011/0108626 A1  May 12, 2011

(51) Int. Cl.
*G06K 19/06* (2006.01)
(52) U.S. Cl.
USPC .......................................................... 235/492
(58) Field of Classification Search
USPC .......................................................... 235/492
See application file for complete search history.

(56) References Cited

U.S. PATENT DOCUMENTS

| | | | |
|---|---|---|---|
| 4,029,945 A | 6/1977 | Yamada et al. | |
| 4,146,781 A | 3/1979 | Machate | |
| 4,575,621 A | 3/1986 | Dreifus | |
| 4,582,985 A | 4/1986 | Löfberg | |
| 4,605,844 A | 8/1986 | Haggan | |
| 4,614,861 A | 9/1986 | Pavlov et al. | |
| 4,667,087 A | 5/1987 | Quintana | |
| 4,689,478 A | 8/1987 | Hale et al. | |
| 4,701,601 A | 10/1987 | Francini et al. | |
| 4,786,791 A | 11/1988 | Hodama | |
| 4,868,376 A | 9/1989 | Lessin et al. | |
| 5,237,165 A | 8/1993 | Tingley, III | |
| 5,434,398 A | 7/1995 | Goldberg | |
| 5,623,552 A | 4/1997 | Lane | |
| 5,841,123 A | 11/1998 | Thorigne et al. | |
| 5,955,961 A | 9/1999 | Wallerstein | |
| 6,188,309 B1 | 2/2001 | Levine | |
| 6,206,293 B1 | 3/2001 | Gutman et al. | |
| 6,257,486 B1 | 7/2001 | Teicher et al. | |
| 2003/0057278 A1 | 3/2003 | Wong | |
| 2006/0161789 A1 | 7/2006 | Doughty et al. | |
| 2007/0241201 A1 | 10/2007 | Brown et al. | |

*Primary Examiner* — Thien M Le
*Assistant Examiner* — Tae Kim
(74) *Attorney, Agent, or Firm* — Schmeiser, Olsen & Watts, LLP; Daniel E. Johnson

(57) ABSTRACT

An electronic card and a method for processing data stored in the electronic card. The electronic card includes a memory containing data to be read by a card reader. The electronic card may include a programmable field source containing wire structures geometrically configured and energized in a manner that drives an electric current through only two wire structures at a time for generating a time varying magnetic field that induces a readback signal in the card reader as the electronic card is being swiped through the card reader. An electrical current in at least one wire in the electronic card generates a time varying magnetic field and may include a finite time derivative of electrical current whose magnitude does not exceed a specified maximum time derivative of electrical current corresponding to a peak voltage threshold ($V_{th}$) and an overshoot ratio (f) of the card reader.

20 Claims, 22 Drawing Sheets

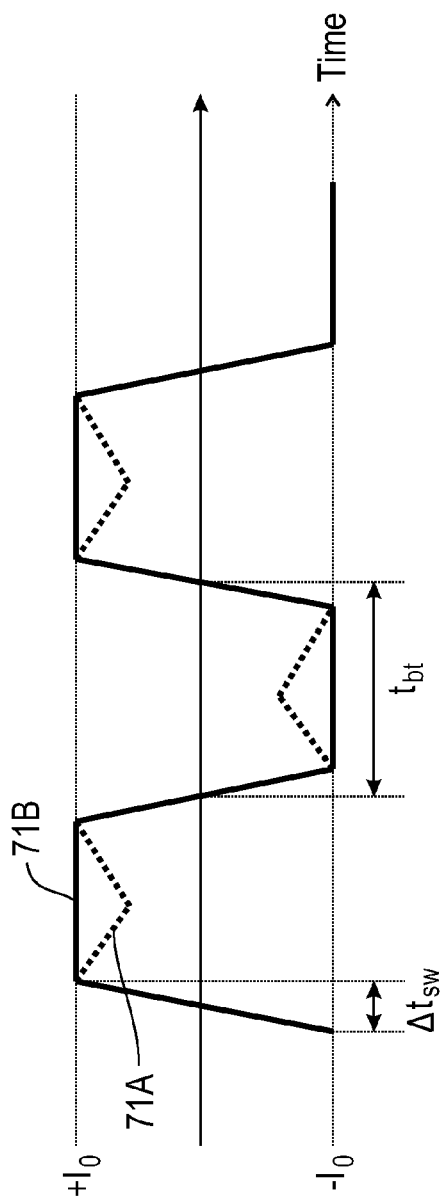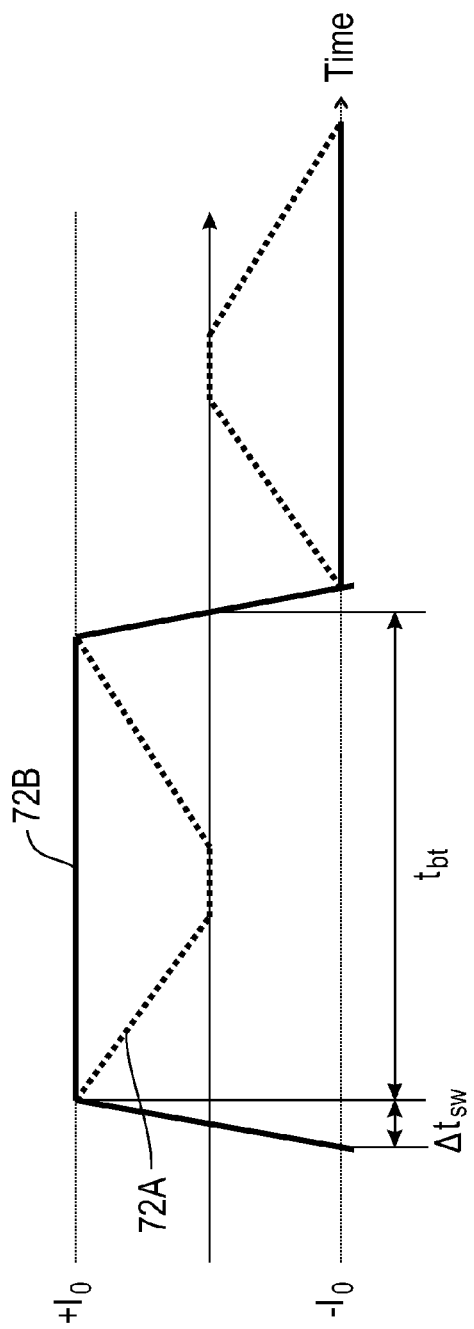

US 8,651,386 B2

ELECTRONIC CARD AND METHOD FOR GENERATING A MAGNETIC FIELD FROM SWIPING THE ELECTRONIC CARD THROUGH A CARD READER

FIELD OF THE INVENTION

The present invention provides an electronic card, a method generally for processing data stored in an electronic card, and more specifically a method for generating a time varying magnetic field from swiping the electronic card through a card reader.

BACKGROUND OF THE INVENTION

Magnetic media or magnetic stripes on credit, identification, or debit cards are widely used for identification and authorization of financial transactions. The data recorded follows established ANSI or ISO/IEC standards. However, these established uses of magnetic stripes on credit cards is prone to fraud, since the code is readable through a card reader or other methods and can be easily duplicated. The prior art discloses cards and card systems that include a processor and associated electronics to make a credit, identification, or debit card programmable and readable in the existing installed base of card readers. However, such prior art card systems use power inefficiently. Thus there is a need for a card and a method for processing the data stored in the card that uses power more efficiently than does card systems of the prior art.

SUMMARY OF THE INVENTION

The present invention provides a method for processing data stored in an electronic card, said method comprising:

accessing a sequence of binary bits, for each data track of at least one data track, from a memory in the electronic card;

determining a time varying electrical current configured to flow in two adjacent wire structures of N wire structures disposed in each data track of the at least one data track to generate a time varying magnetic field that encodes the sequence of binary bits, N being at least 3; and generating the time varying magnetic field as the card is swiped through a card reader in a minus X direction by driving the time varying electrical current through the two adjacent wire structures, said time varying magnetic field inducing a readback signal in the card reader;

wherein the card comprises a substrate, a processor disposed in the substrate, the at least one data track disposed in the substrate such that each data track is oriented in the X direction, the memory disposed in the substrate, a switch apparatus disposed in the substrate, the N wire structures disposed in each data track, and a power source disposed in the substrate, wherein the power source provides electrical power to the processor, the switch apparatus, and the N wire structures disposed in each data track, wherein said generating the time varying magnetic field comprises said processor operating the switch apparatus with respect to the N wire structures, wherein said operating the switch apparatus comprises electrically coupling the two adjacent wire structures of the N wire structures in each data track to the power source and electrically decoupling all other wire structures of the N wire structures from the power source, and wherein said electrically coupling the two adjacent wire structures and said electrically decoupling all other wire structures causes the power source to generate a voltage drop that drives the time varying electrical current through each wire structure of the two adjacent wire structures but no electrical current through any other wire structure of the N wire structures, which generates the time varying magnetic field above each wire structure of the two adjacent wire structures but not above any other wire structures of the N wire structures.

The present invention provides an electronic card, comprising:

a substrate;

at least one data track disposed in the substrate, each data track oriented in a X direction;

a processor disposed in the substrate;

a sequence of binary bits for each data track stored in a memory within the substrate;

a switch apparatus disposed in the substrate;

N coils disposed in each data track and stacked in a Z direction normal to the X direction, said N at least 3, successive coils of the N coils overlapping each other in the Z direction and displaced from each other in the X direction such that a minimum and maximum X coordinate for the X direction of successive coils increases; and a power source disposed in the substrate, said power source configured to provide electrical power to the processor, the switch apparatus, and the N coils in each data track, said processor configured generate a time varying magnetic field including being configured to operate the switch apparatus, as the card is being swiped through the card reader in the minus X direction, wherein being configured to operate the switch apparatus comprises being configured to electrically couple two adjacent coils of the N coils in each data track to the power source and to electrically decouple all other coils of the N coils from the power source, which causes the power source to generate a voltage drop that drives about a same electrical current through each coil of the two adjacent coils but no electrical current through any other coil of the N coils to generate the time varying magnetic field above the two adjacent coils but not above any other coil of the N coils, and wherein the time varying magnetic field for each data track is configured to encode the sequence of binary bits for each data track and to induce a readback signal in the card reader.

The present invention provides a method for processing data stored in an electronic card, said method comprising:

accessing a sequence of binary bits, for each data track of at least one data track, from a memory of the electronic card;

determining a time varying electrical current configured to flow in at least one wire disposed in each data track of the at least one data track to generate a time varying magnetic field that encodes the sequence of binary bits; and generating the time varying magnetic field as the card is swiped through a card reader in a minus X direction, said time varying magnetic field inducing a readback signal in the card reader;

wherein the card comprises a substrate, a processor disposed in the substrate, the at least one data track disposed in the substrate such that each data track is oriented in a X direction, the memory disposed in the substrate, the at least one wire disposed in the substrate, and a power source disposed in the substrate, wherein the power source provides electrical power to the processor and the at least one wire, wherein said generating the time varying magnetic field comprises generating a voltage drop that drives the time varying electrical current through the at least one wire to generate the time varying magnetic field, and wherein said generating the time varying magnetic field comprises generating a finite time derivative of electrical current in the at least one wire at times when no finite time derivative of electrical current is logically required for generating the time varying magnetic field, and wherein a magnitude of the finite time derivative of electrical current does not exceed a specified maximum time derivative of electrical current corresponding to a peak voltage threshold ($V_{th}$) and an overshoot ratio (f) of the card reader.

The present invention advantageously provides a card and a method for processing the data stored in the card that uses power more efficiently than does card systems of the prior art.

BRIEF DESCRIPTION OF THE DRAWINGS

FIGS. 12A and 12B depict exemplary waveforms of electric current of the present invention in comparison with a standard current waveform.

DETAILED DESCRIPTION OF THE INVENTION

To read a conventional card with magnetic stripe, the card is swiped in close proximity to an inductive reader. The inductive reader detects the variations of flux in its gap. The readback voltage read by the inductive reader is proportional to the temporal variation of the horizontal component of the magnetic field (Hx) close to the gap, whose origin is the stray fields from the magnetic stripe.

The present invention replaces the conventional card with an electronic card having current-carrying electrical coils that generate time varying magnetic field that induces a readback signal in a card reader as the electronic card is swiped through the card reader.

The present invention provides methods of exciting the wires or coil structures that reduce power consumption and effectively transmit data in the electronic card to the card reader.

Figure 1:
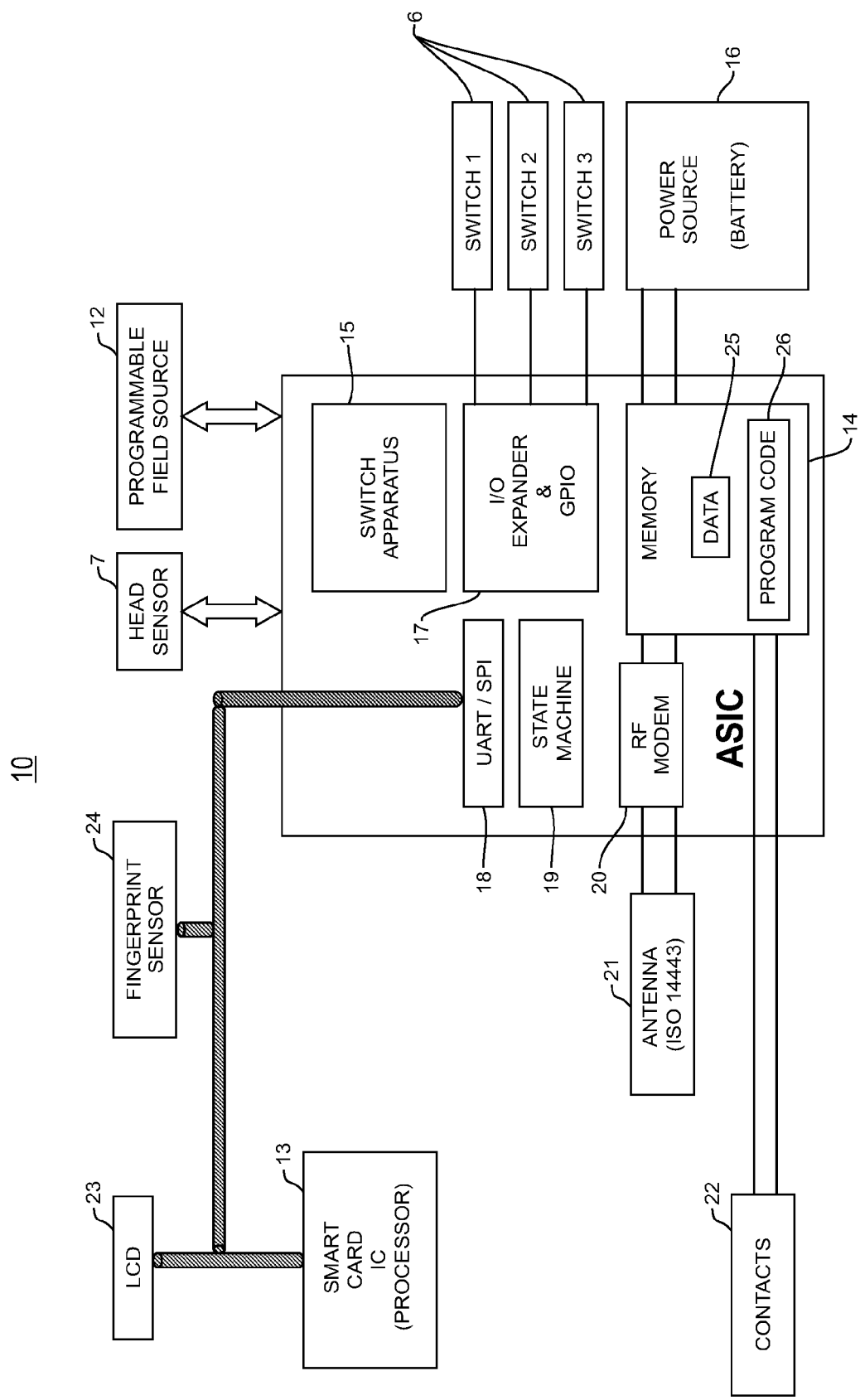
FIG. 1 is a block diagram of an electronic card that comprises a programmable magnetic stripe emulator, in accordance with embodiments of the present invention.

FIG. 1 is a block diagram of an electronic card 10, in accordance with embodiments of the present invention. The electronic card 10 includes a substrate (not shown in FIG. 1 but depicted in FIG. 2), a programmable field source 12, a processor 13, a memory 14, a switch apparatus 15, a power source 16 depicted as a battery in one embodiment, an I/O Expander & GPIO (general purpose input/output) 17, a UART (universal asynchronous receiver/transmitter)/SPI (serial peripheral interface) 18, a state machine 19, a RF Modem 20, an RF antenna 21, contacts 22, a LCD 23, a head sensor 7 (for reading), switches 6 (for use by user to switch on and off functions of the smart card) and a fingerprint sensor 24.

The memory 14 comprises multiple portions thereof, including: data 25 structured as a sequence of binary bits whose values are to be read by a card reader; and program code 26 configured to be executed by the processor 13 to spatially localize a time varying magnetic field which encodes the data 25 and which induces a readback signal in a card reader as the electronic card 10 is swiped through the card reader.

The scope of the present invention includes encoding the data 25 in accordance with any encoding technique known to a person of ordinary skill in the art. For example, the binary bits (0, 1) of the data 25 may be encoded into a waveform of steps in which each step has a value of +A or −A (i.e., minus A), with +A in a clock cycle representing a bit of 1 and −A in a clock cycle representing a bit of 0. As another example, the binary bits of the data 25 may be encoded into a waveform of steps in which each step has a value of +A or −A and in which a second clock cycle immediately follows a first clock cycle, wherein if the waveform has a same value (i.e., either +A or −A) in transitioning from the first clock cycle to the second clock then a bit of 0 is represented by the waveform in the second clock cycle, and wherein if the waveform changes its value (i.e., from −A to +A or from +A to −A) in transitioning from the first clock cycle to the second clock cycle then a bit of 1 is represented by the waveform in the second clock cycle.

Figure 4:
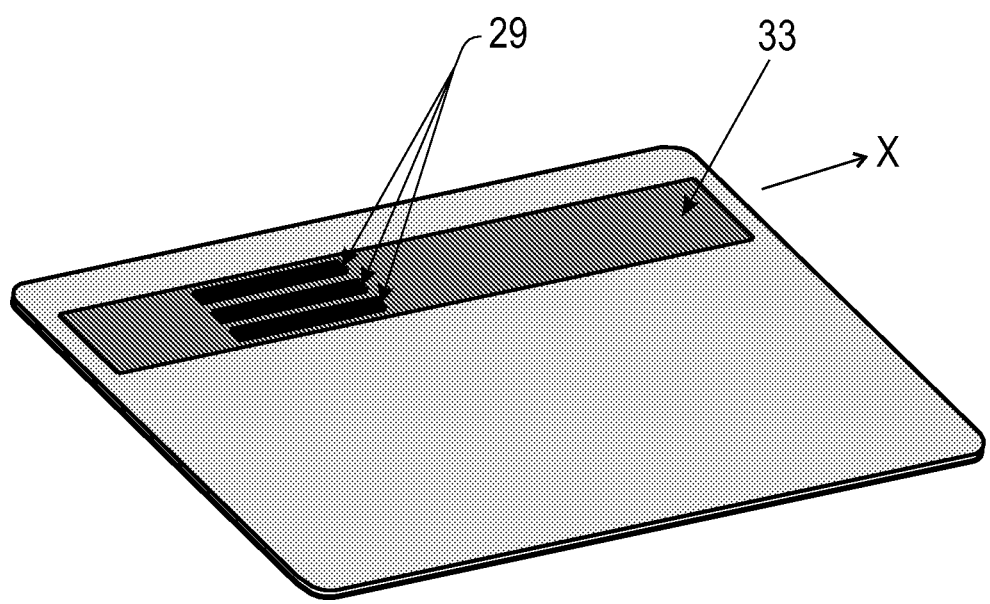
FIG. 4 depicts a placement of field source or wire structures to emulate 3 adjacent data tracks on the programmable field source, in accordance with embodiments of the present invention.

The programmable field source 12 is a source of magnetic field that comprises at least one data track as depicted in FIG. 4 which is described infra. Each data track comprises one or more wire structures configured to carry electric current to generate magnetic fields that are probed by a card reader, as the electronic card 10 is swiped through the card reader, to induce a readback signal in the card reader that may be decoded to reveal the data in the memory 14 as described infra.

Figure 2:
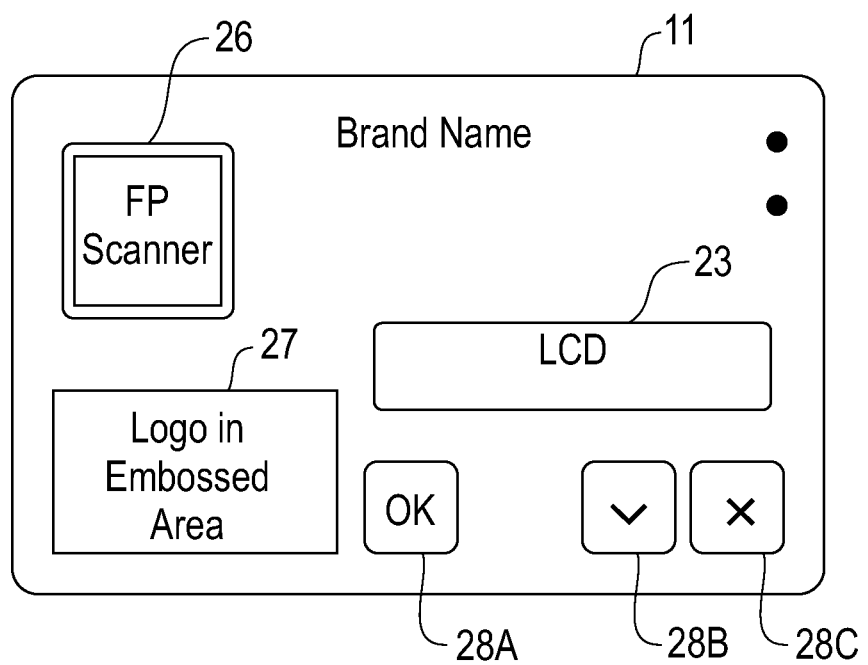
FIG. 2 is a schematic of a first side of the electronic card of FIG. 1, in accordance with embodiments of the present invention.

FIG. 2 is a schematic of a first side (e.g., front side) of the electronic card 10 of FIG. 1, in accordance with embodiments of the present invention. FIG. 2 depicts the electronic card 10 as comprising a substrate 11, in which is embedded or stored the LCD 23, a finger print scanner 26, a logo in embossed area 27, and buttons 28A, 28B, and 28C which correspond to the switches 6 of FIG. 1. Also stored in the substrate 11 are the programmable field source 12, the processor 13, the memory 14, the switch apparatus 15, the power source 16, the I/O Expander & GPO 17, the UART/UPI 18, the state machine 19, the RF Modem 20, the RF antenna 21, the contacts 22, and the fingerprint sensor 24 depicted in FIG. 1.

The electronic card 10 may serve as a credit card, a debit card, or any card whose stored data 25 serves as an identifier (e.g., an insurance card, a security card such as a card used for accessing a facility, a social security card, a bank card, etc.). In one embodiment, the electronic card 10 has geometric dimensions of a conventional credit card (i.e., 3 inches×2 inches). In one embodiment, the substrate 11 is made of a plastic or other suitable material.

Figure 3:
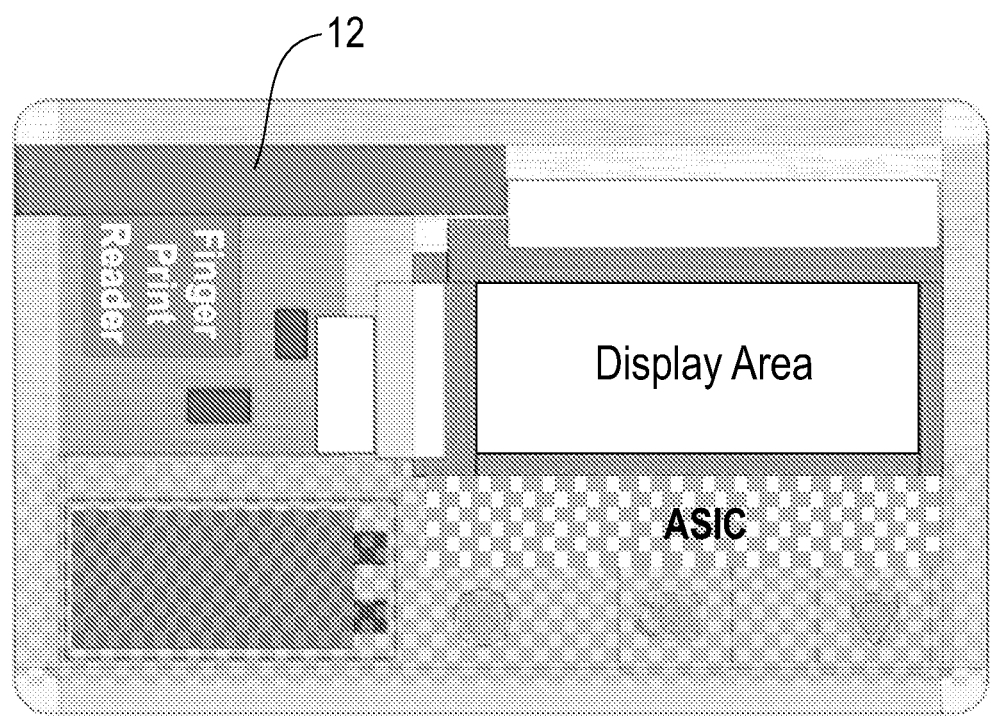
FIG. 3 is a schematic of a second side of the electronic card of FIG. 1 and depicts the programmable field source of FIG. 1 as being located in the same area that is ordinarily occupied by the magnetic stripe of a conventional card, in accordance with embodiments of the present invention.

FIG. 3 is a schematic of a second side (e.g., reverse side) of the electronic card 10 of FIG. 1 and depicts the programmable field source 12, which accommodates the head position sensor 7 and comprises the wire structure that acts as a field source, as being located in a same area that is ordinarily occupied by the magnetic stripe of a conventional card, in accordance with embodiments of the present invention. The area occupied by the programmable field source 12 is used in the present invention to contain current-carrying electrical wires that generate time varying magnetic fields for inducing a readback signal in a card reader as the electronic card of the present invention is swiped through the card reader. The tracks 29 are oriented in a X direction.

FIG. 4 depicts a placement of field source wire structures to emulate 3 adjacent data tracks 29 in area 33 with the programmable field source 12, in accordance with embodiments of the present invention. Each data track 29 contains the current-carrying electrical wire structures that generate the time varying magnetic. The area 33 is where a magnetic stripe in a conventional card is located.

Figure 5:
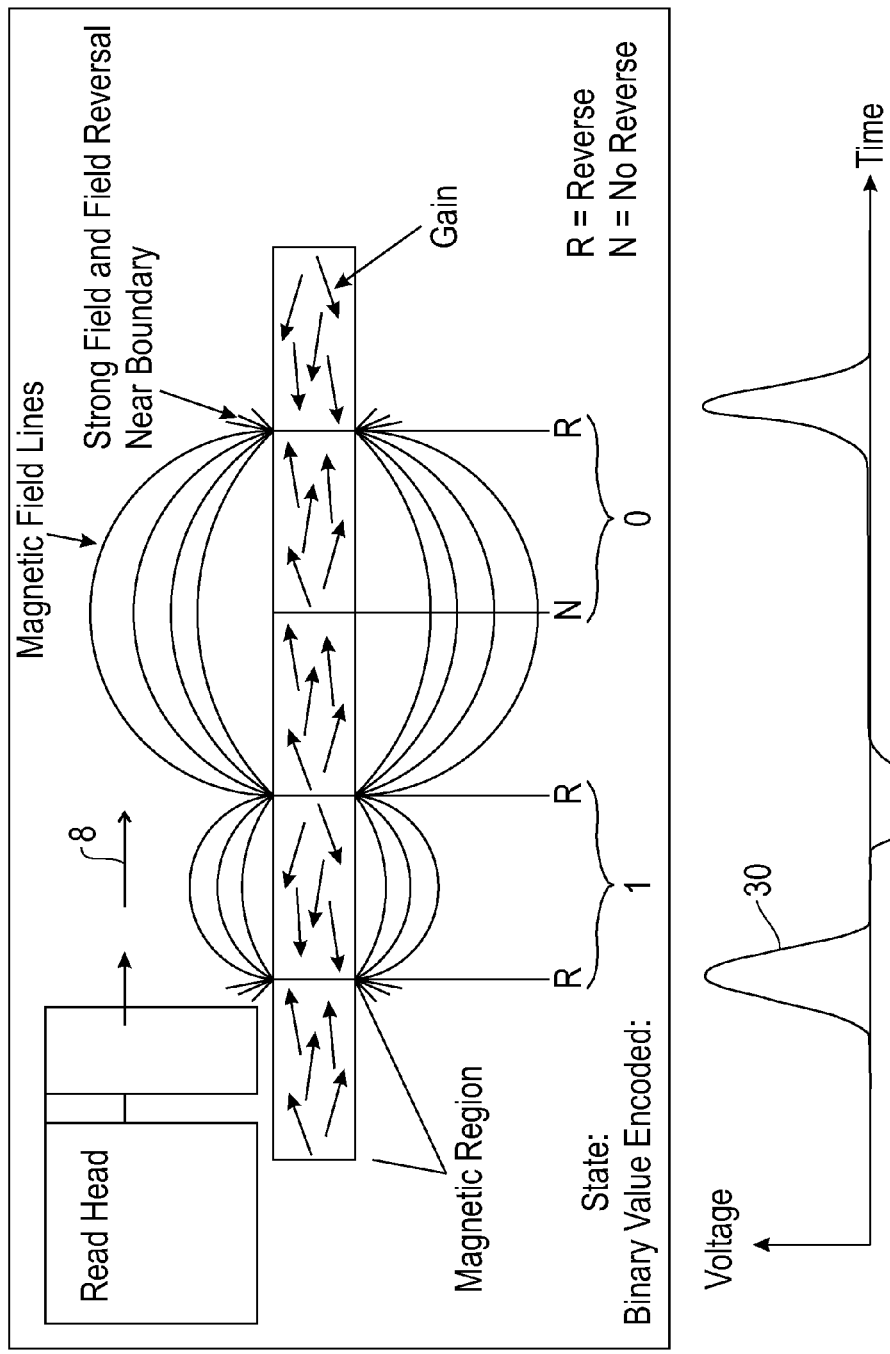
FIG. 5 is a graphical illustration of the qualitative characteristics of the magnetic field lines from in-plane magnetized media of a magnetic stripe of a conventional credit card or debit card.

FIG. 5 is a graphical illustration of the qualitative characteristics of the magnetic field lines from in-plane magnetized media of a magnetic stripe of a conventional credit card or debit card. The field lines emanate from regions of the media where the magnetization reverses and no field lines originate from regions of the media where the magnetization is unchanged. In terms of the horizontal component (Hx) of the magnetic field, around regions where the magnetization reverses, Hx also reverses from +H to −H or from −H to +H. For regions where the magnetization in the magnetic stripe is unchanged, however, the amplitude of Hx is not changing significantly. As a result during the swipe of the magnetic stripe of the electronic card, the inductive read head of a card reader will produce a readback signal 30 (voltage) with peaks only when the read head, which is moving in the direction 8, passes above regions of the media with magnetization transitions as depicted in FIG. 5. The magnetic card information is coded through the relative position of the magnetization transitions on the stripe, and the encoding of the magnetic card information is such that the readback signal is independent of the velocity of the swipe.

Figure 6:
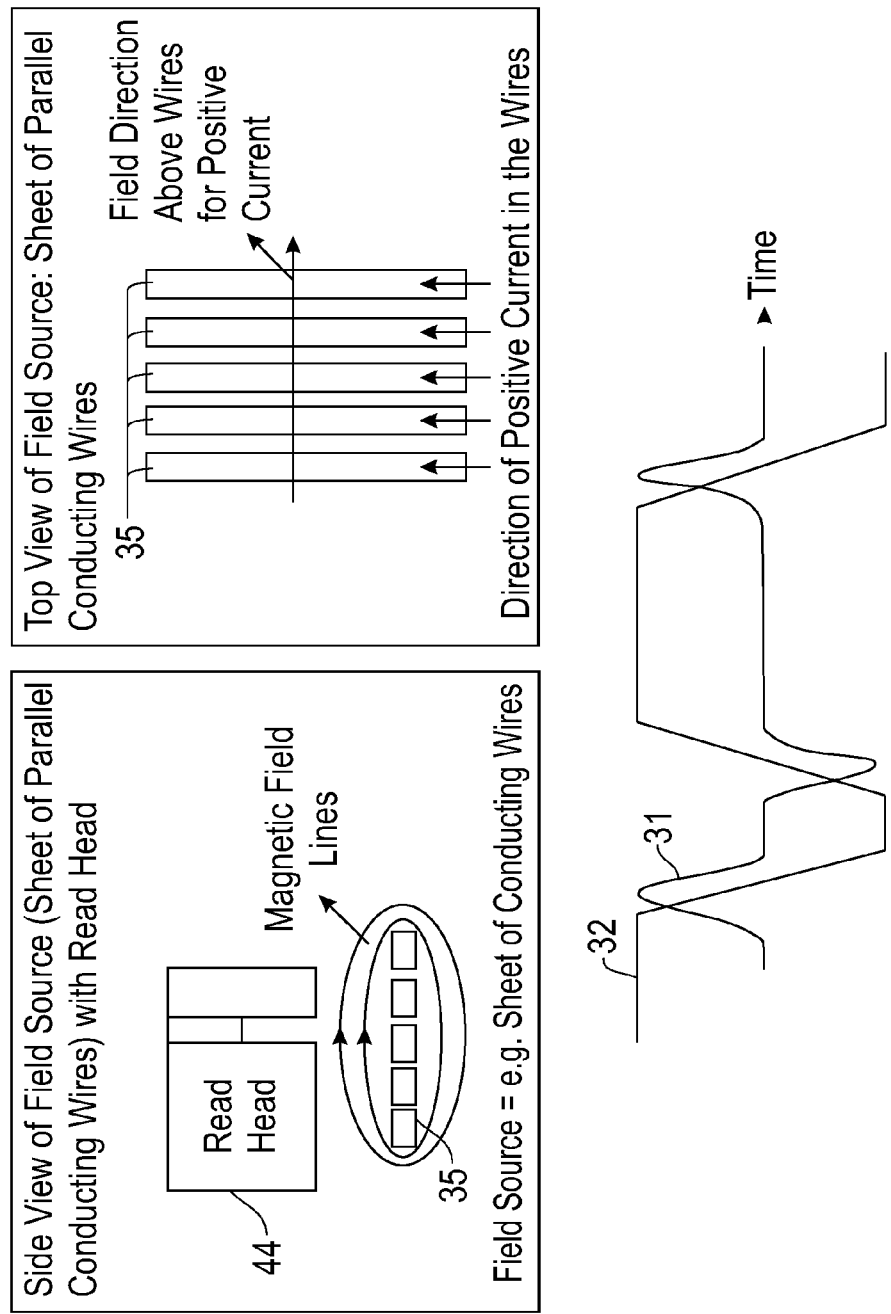
FIG. 6 is a graphical illustration of magnetic field lines generated from electrical current in the programmable field source of the electronic card, in accordance with embodiments of the present invention.

FIG. 6 is a graphical illustration of magnetic field lines generated from electrical current in the programmable field source 12 of the electronic card 10 (see FIG. 1), in accordance with embodiments of the present invention. In particular, the readback signal 31 is a voltage signal that is induced in the inductive read head 44 of the card reader as the electronic card 10 is swiped through the card reader, as a consequence of the time varying magnetic field Hx(t) that is generated from the electrical current in the conducting wires 35. The readback signal 31 of the present invention is the same readback signal that would have been induced in the read head 34 if a conventional credit card having a magnetic stripe were swiped through the card reader, provided that the changes of field amplitude from +H to −H or from −H to +H of the magnetic field Hx(t) are spaced in time in a manner that simulates the relative spatial position of the magnetization transitions in the magnetic stripe of the conventional credit card.

Because the user will swipe the electronic card 10 through the card reader with the present invention, the field source (i.e., the electric current in the conducting wires 35) needs to remain under the read head 34 for a duration that is long enough to transmit the complete card information to the card reader. This could be achieved by having a long enough field source that provides a homogeneous field over such a long distance. Not all coil structures are appropriate, particularly if low power is required. For example, a long set of parallel wires would provide at the reader gap the magnetic field Hx~n'*i/2, with n' being the density of conduction wires and i the current in each wire. Such implementation necessitates, however, a too large electrical current per swipe, and therefore too much power per swipe, to be compatible with powering the electronic card 10 with a battery. Instead, to reduce the power required to operate the electronic card 10, the present invention uses wire structures comprising multiple local magnetic field sources that are addressed sequentially as a function of the positions of the read head above the wire structures. The wire structures may include overlapping multi-turns flat coils or adjacent sets of flat wires connected in parallel. The present invention provides a method for energizing the wire structures in a manner that reduces power requirements. The overlapping multi-turns flat coils as described in more detail below are equivalent locally to a set of adjacent flat wires except that these wires are connected in series rather than in parallel. The connection of these wires in series necessitates a smaller total current from the power source 16 (see FIG. 1) at the expense of a small increase in power per swipe.

The embodiment of overlapping multi-turns flat coils is discussed next with respect to FIGS. 7A-11, and the embodiment of adjacent sets of flat wires connected in parallel is discussed infra with respect to FIGS. 16-18.

Figure 7A:
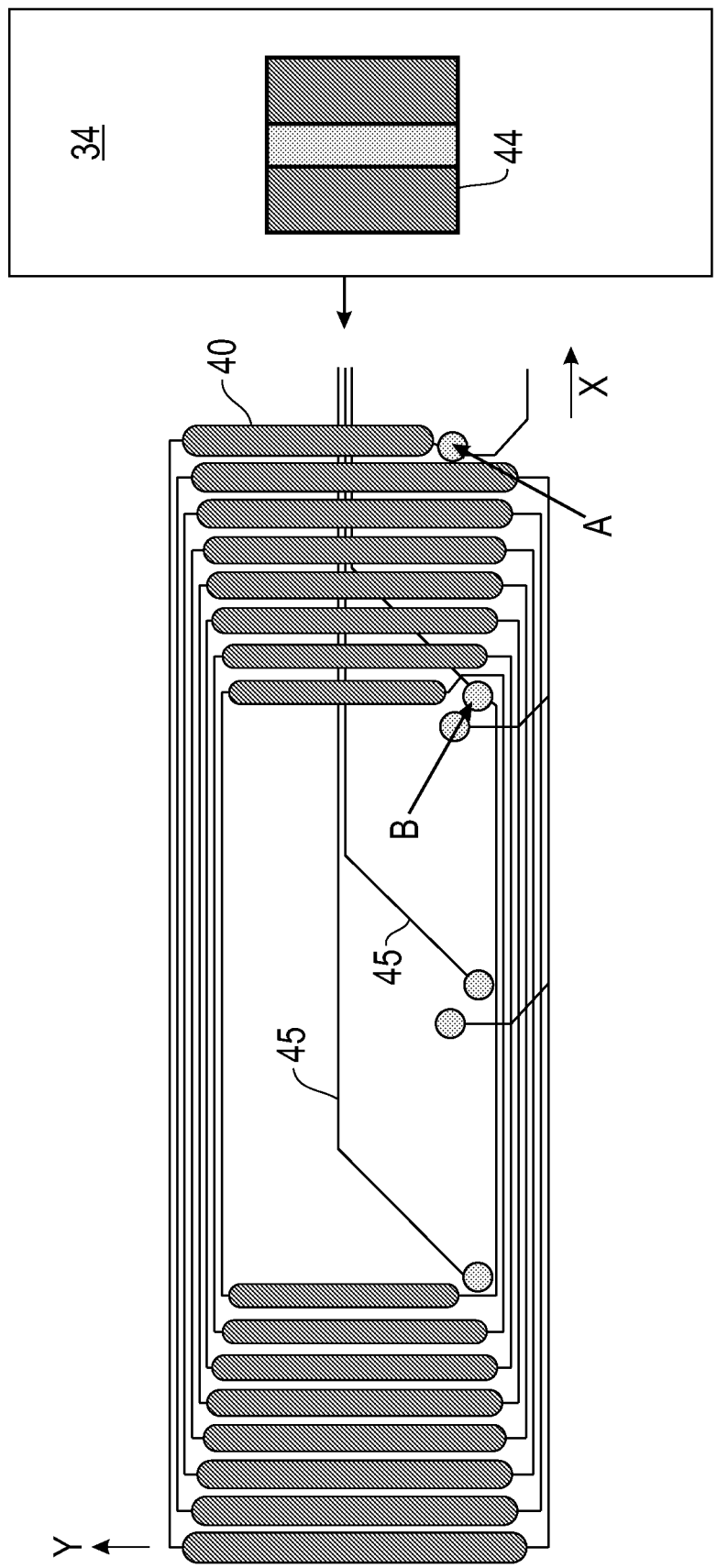
FIG. 7A depicts a two dimensional view of a coil disposed in a data track of the programmable field source of an electronic card in terms of a rectangular coordinate system, in accordance with embodiments of the present invention.

With respect to the embodiment of overlapping coils, FIG. 7A depicts a two dimensional view of a coil 40 disposed in a data track of the programmable field source 12 of the electronic card 10 in terms of a rectangular coordinate system having X and Y coordinate axes respectively defining X and Y directions, in accordance with embodiments of the present invention. The coil 40 comprises contacts A and B at respective ends of the coil 40. The contacts A and B may be electrically connected to the power source 16 (e.g., a battery) by a switch apparatus (e.g., a multiplexer) under control of the processor 13 as described infra (see FIG. 1).

A card reader 34 comprising a read head 44 is above the coil 40 (i.e., above the X-Y plane encompassing the coil 40) and is thus in a spatial position that enables a readback signal to be induced in the card reader 34 from the electrical current in the coil 40 as the electronic card 10 is being swiped in the card reader 34 in the −X (i.e., minus X) direction. The wires 45 connect the coil 40 to another coil (not shown) that overlaps the coil 40 as will be described infra (see overlapping coils in FIG. 8A).

Figure 7B:
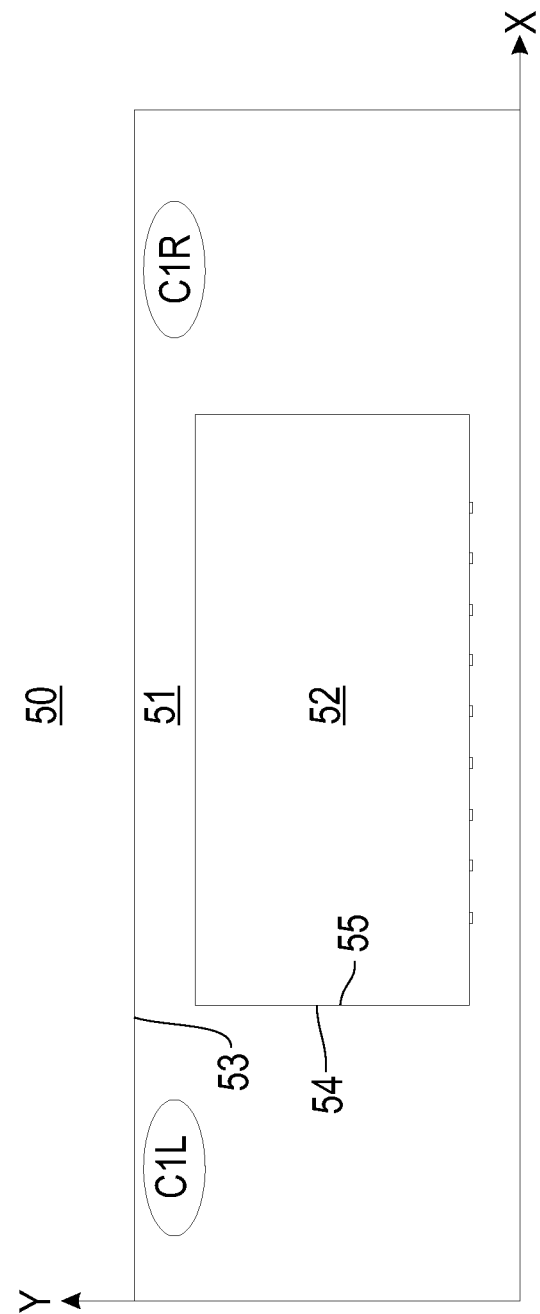
FIG. 7B depicts the outer envelope of a top view of the coil of FIG. 7A, in accordance with embodiments of the present invention.

FIG. 7B depicts the outer envelope (or the outermost geometrical boundaries) of a top view of the coil 40 of FIG. 7A, in accordance with embodiments of the present invention. The outer envelope defines a coil structure 50 comprising an outer ring 51 and an interior void 52. An outermost boundary 53 of the outer ring 51 defines the outer envelope of the coil 40. An innermost boundary 54 of the outer ring 51 is an inner envelope of the coil 40. The interior void 52 is devoid of electrical wires.

Denoting the coil 40 as coil C1, the outer ring 51 of coil C1 comprises branches that consist of a left branch denoted as C1L and a right branch denoted as C1R such that the interior void 52 is disposed between the left branch C1L and the right branch C1R.

Figure 7C:
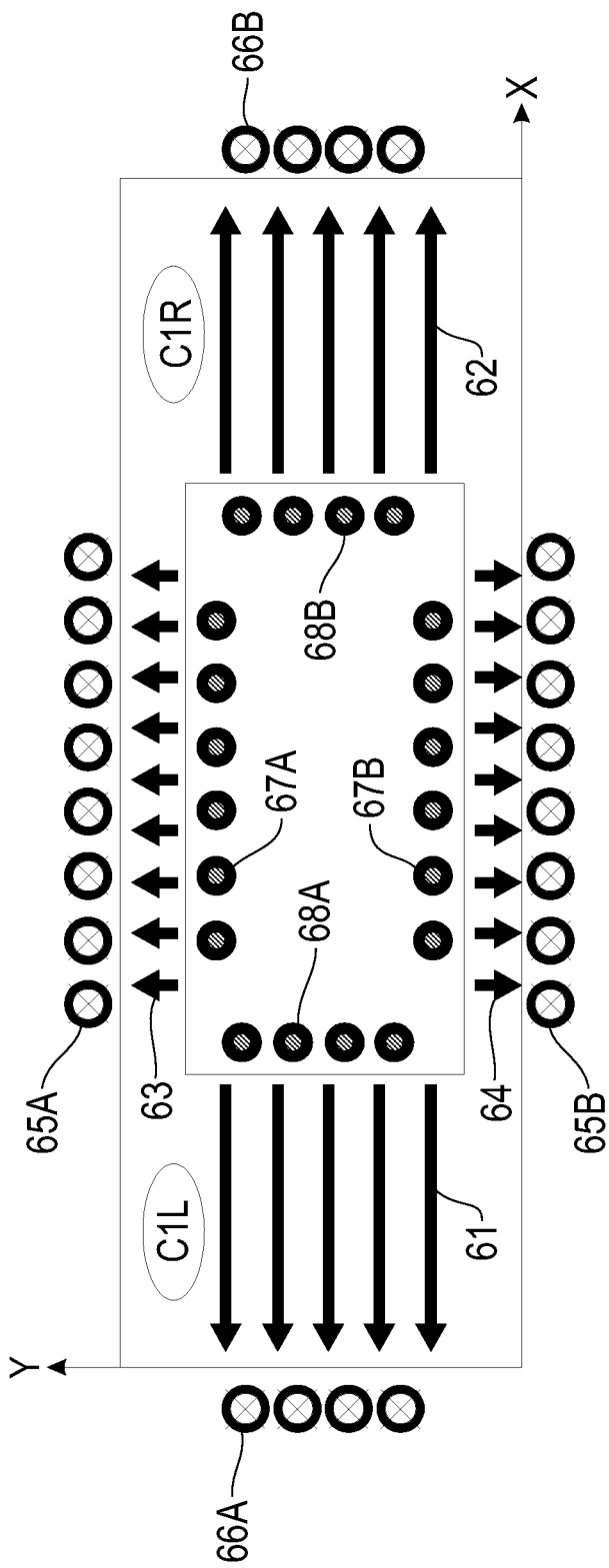
FIG. 7C depicts magnetic fields generated above the coil structure of FIG. 7B when a positive current flows in the coil between terminal contacts of the coil, in accordance with embodiments of the present invention.

FIG. 7C depicts magnetic fields generated above the coil structure 50 of FIG. 7B when a positive current flows in the coil 40 from contact A to contact B in the coil 40 (see FIG. 7A), in accordance with embodiments of the present invention. The magnetic fields 61 and 62 over the branches C1L and C1R, respectively, of the coil 40 are equal in magnitude and opposite in direction (i.e., in the −X and +X directions, respectively). The amplitude of the magnetic fields 61 and 62 H is proportional to n'*i1/2, wherein i1 denotes the current in the coil 40 (which is also the current in each other wire that overlaps the coil 40 as discussed infra), and wherein n' denotes the number of turns of wire in the coil 40. If the polarity of the current is inverted, the directions of the magnetic fields 61 and 62 are also inverted.

The magnetic fields 63 and 64 in portions of the outer ring 51 outside of the branches C1L and C1R are directed in the +Y and −Y directions, respectively. Because of their orientation in the +Y and −Y directions, they do not contribute to the readback signal. The magnetic fields 65A and 65B adjacent to and outside of the outer ring 51 are in the YZ plane and are mostly directed in the −Z direction, wherein the Z direction is perpendicular to both the X and Y directions, and wherein the X, Y, Z axes respectively associated with the X, Y, Z directions form a right-handed three-dimensional rectangular coordinate system. These magnetic fields are relatively small and, because of their orientation in the YZ plane, do not contribute to the readback signal. The magnetic fields 67A and 67B in the interior void 52 are in the YZ plane and are mostly directed in the +Z direction. These magnetic fields are relatively small and, because of their orientation in the YZ plane, do not contribute to the readback signal of the inductive head. The magnetic fields 68A and 68B in the interior void 52 are in the XZ plane and mostly directed in the +Z direction. These magnetic fields are relatively small and do not contribute significantly to the readback signal in the inductive head. The magnetic fields 66A and 66B adjacent to and outside the outer ring 51 are in the XZ plane and mostly directed in the +Z direction. These magnetic fields are relatively small and do not contribute significantly to the readback signal in the inductive head. Besides, in the configuration of overlapping coils C1L and C2L (see FIGS. 8A and 8B), the fields 68A of the coil C1L and 66A of the coil C2L will be equal in strength and opposite in direction such that they cancel out in the reader gap. Similarly, the fields 66B of the coil C1L and the fields 68B of the coil C2L will be equal in strength and opposite in direction such that they cancel out in the reader gap.

Figure 8A:
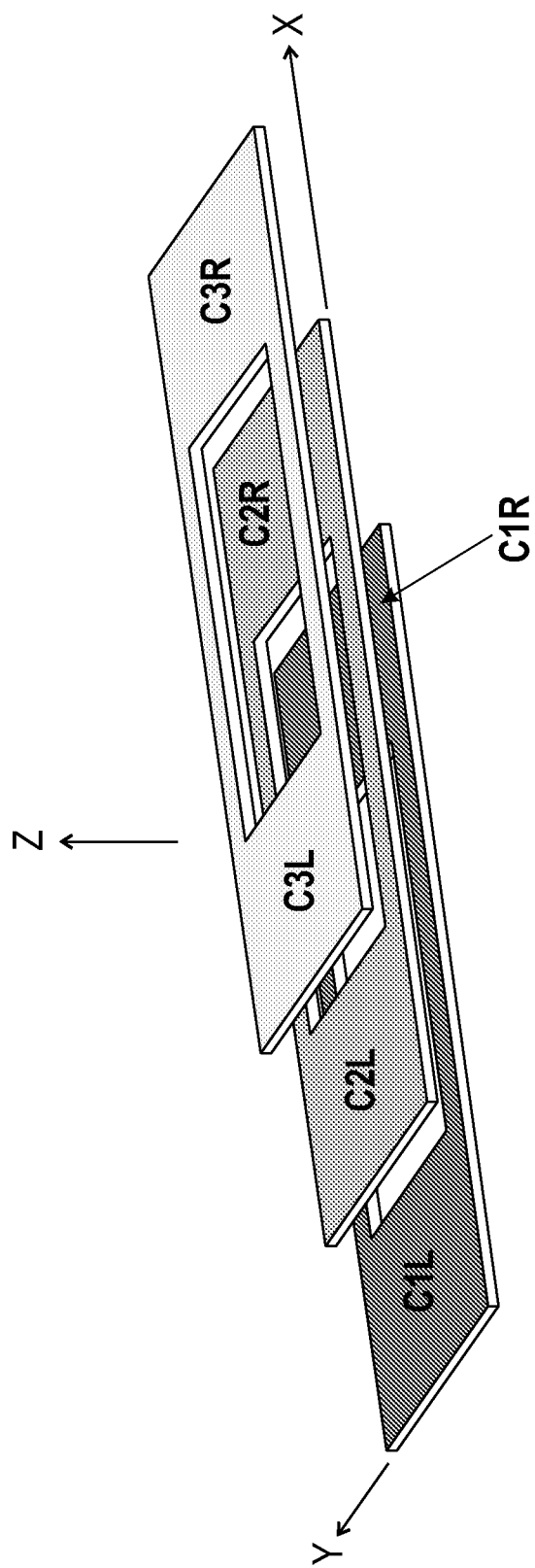
FIG. 8A is a three dimensional view of the envelopes of three overlapping coils in the three dimensional X, Y, Z coordinate system, in accordance with embodiments of the present invention.
Figure 8B:
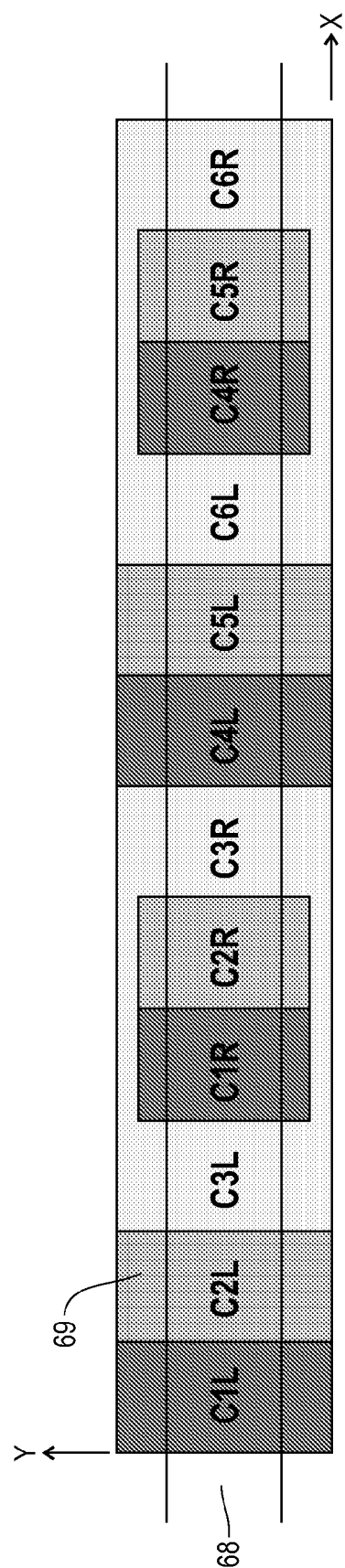
FIG. 8B is a top view of the envelopes of six coils whose left and right branches are arranged in an ordered sequence in the X direction, in accordance with embodiments of the present invention.

FIG. 8A is a three dimensional view of the envelopes of three overlapping coils in the X, Y, Z coordinate system, in accordance with embodiments of the present invention. FIG. 8B is a top view of the envelopes of six coils whose left and right branches are arranged in an ordered sequence in the X direction, in accordance with embodiments of the present invention.

In FIGS. 8A and 8B, there are N coils in each data track denoted as coil 1 (C1), coil 2 (C2), . . . , coil N (CN), wherein N=3 in FIG. 8A and N=6 in FIG. 8B. In one embodiment, each coil of the N coils in each data track comprises essentially a same electrical resistance. The outer ring of coil Cn (n=1, 2, . . . , N) comprises branches that consist of a left branch denoted as CnL and a right branch denoted as CnR. The interior void of coil Cn is disposed between the left branch CnL and the right branch CnR. There is no overlap between the branches of different coils of the N coils.

The branches of the N coils are in an ordered sequence in the X direction of C1L, C2L, C3L, C1R, C2R, C3R, . . . , C(3j-2)L, C(3j-1)L, C(j)L, C(3j-2)R, C(3j-1)R, C(3j)R, C(3J-2)L, C(3J-1)L, C(J)L, C(3J-2)R, C(3J-1)R, C(3J)R. The preceding sequence of the branches of the N coils comprises J groups of 3 overlapping coils in each group (i.e., j=1, 2, . . . , J), wherein J=N/3. The notation C(k')L and C(k')R denotes CkL and CkR, respectively, wherein k is a numerical value of k'. For example, C(3j-2)L denotes C4L for j=2.

A first branch and a second branch of each two consecutive branches in the ordered sequence are positioned in the X direction such that a minimum X coordinate of the second branch and a maximum X coordinate of the first branch are aligned in the Z direction to define an interface between the first and second branches. For example, the first branch C2L and the second branch C3L of the two consecutive branches C2L and C3L in the ordered sequence are positioned in the X direction such that a minimum X coordinate of the branch C3L and a maximum X coordinate of the branch C2L are aligned in the Z direction to define an interface 69 between the branches C2L and C3L.

Since only the field source (i.e., left or right branch of the coil structure) under the read head 44 of the card reader 34 needs to be energized, it is not necessary to energize all of the coils simultaneously. Accordingly, the present invention includes the detection of the position of the reader 34 above the N coils (i.e., identifying which branch of a coil of the branches of the N coils the read head 44 is directly over). The position of the reader 34 may be determined by monitoring the effective impedance of the coils or by a separate method for sensing the magnetic field change due to the presence of the permeable material in the reader. However, one embodiment uses a method for detecting the complex impedance of the coil, since the complex impedance changes due to the presence of the permeable material in the card reader. A sensitive method for detecting the impedance is to monitor the oscillation frequency of a resonant circuit using a fixed and known capacitance in series or parallel with the coil.

In one embodiment, the time varying magnetic field is essentially spatially constant above two successive branches of two adjacent coils. Two adjacent coils of the N coils consist of two coils of the N coils such that no other coil of the N coils is disposed between and connected to the two coils of the N coils. To avoid a discontinuity of magnetic field 61 (or 62) (see FIG. 7C) at the interface between two successive branches in the ordered sequence when the reader moves from one branch of the N coils to the following branch of a coil, two adjacent coils of the N coils are energized by the power source 16 (see FIG. 1) at a same time such that no other coils of the N coils are energized. Avoiding a discontinuity of magnetic field 61 (or 62) ensures that the read head 44 does not sense a change in magnetic field due to the displacement of the read head 44 over a transition between two successive branches of two adjacent coils but rather only due to a variation in the time-dependent currents flowing through the coils.

In other words, the magnetic field 61 (or 62) is continuous spatially as the reader traverses the branches of the coils, because currents in the two adjacent coils are electrically connected to flow similarly in the two contiguous branches of the two coils. In addition, at the transition between two contiguous branches of two adjacent coils which are energized with currents in the two contiguous branches having equal magnitude and same direction relative to the Y direction, there is no field along any other direction (i.e., X or Z direction). With current flowing in the same direction in C2L and C3L branches, the fields 66A and 68A cancel out.

After the data 25 is read from the memory 14 under control of the processor 13, the coils are energized in a defined sequence to always provide the necessary magnetic field at the gap of the reader and this defined sequence depends on the position of the read head 44 above each branch of the N coils (CnL or CnR). This defined sequence is implemented using the switch apparatus 15 (e.g., multiplexer—see FIG. 1) that has as an input an indexed position of the read head 44 above the branches of the N coils. In one embodiment, the switch apparatus 15 connects two coils at the same time to the power source.

Table 1 identifies the defined sequence assuming that the power source 16 is a voltage source (e.g., a battery) having a first electrode at a first electrical potential ($\phi_1$) and a second electrode at a second electrical potential ($\phi_2$). The contacts A and B (see FIG. 7A) of coil Cn are respectively denoted as Cn(A) and Cn(B) for n=1, 2, . . . , N.

TABLE 1

| Branch That Read Head is Over | Contacts Connected To First Electrode (E1) of Voltage Source | Contacts Connected To Second Electrode (E2) of Voltage Source |
| --- | --- | --- |
| C1L | C1(A) and C2(A) | C1(B) and C2(B) |
| C2L | C2(A) and C3(A) | C2(B) and C3(B) |
| C3L | C3(A) and C1(B) | C3(B) and C1(A) |
| C1R | C1(B) and C2(B) | C1(A) and C2(A) |
| C2R | C2(B) and C3(B) | C2(A) and C3(A) |
| C3R | C3(B) and C4(A) | C3(A) and C4(B) |
| C4L | C4(A) and C5(A) | C4(B) and C5(B) |

TABLE 1-continued

| Branch That Read Head is Over | Contacts Connected To First Electrode (E1) of Voltage Source | Contacts Connected To Second Electrode (E2) of Voltage Source |
| --- | --- | --- |
| C5L | C5(A) and C6(A) | C5(B) and C6(B) |
| C6L | C6(A) and C4(B) | C6(B) and C4(A) |
| C4R | C4(B) and C5(B) | C4(A) and C5(A) |
| C5R | C5(B) and C6(B) | C5(A) and C6(A) |
| C6R | C6(B) and C7(A) | C6(A) and C7(B) |
| etc. | | |

Thus, the processor 13 ascertains that the card reader 34 is in a spatial position that enables the readback signal to be induced in the card reader from the time varying magnetic field generated by the electrical current in a branch CnI of the coil Cn (n=1, 2, . . . , N and I=R or L).

Responsive to ascertaining that the card reader 34 is in a spatial position that enables the readback signal to be induced in the card reader 34, the processor 13 operates the switch apparatus 15 to electrically couple the coil Cn and the adjacent coil Ck, which has a branch CkJ (k=1, 2, . . . N and J=R or L) placed right after the branch CnI in the X direction, to the power source and to electrically decouple all other coils of the N coils from the power source 16 to cause the power source 16 to drive the electrical current through the two coils Cn and Ck and through no other coil of the N coils.

Figure 9A:
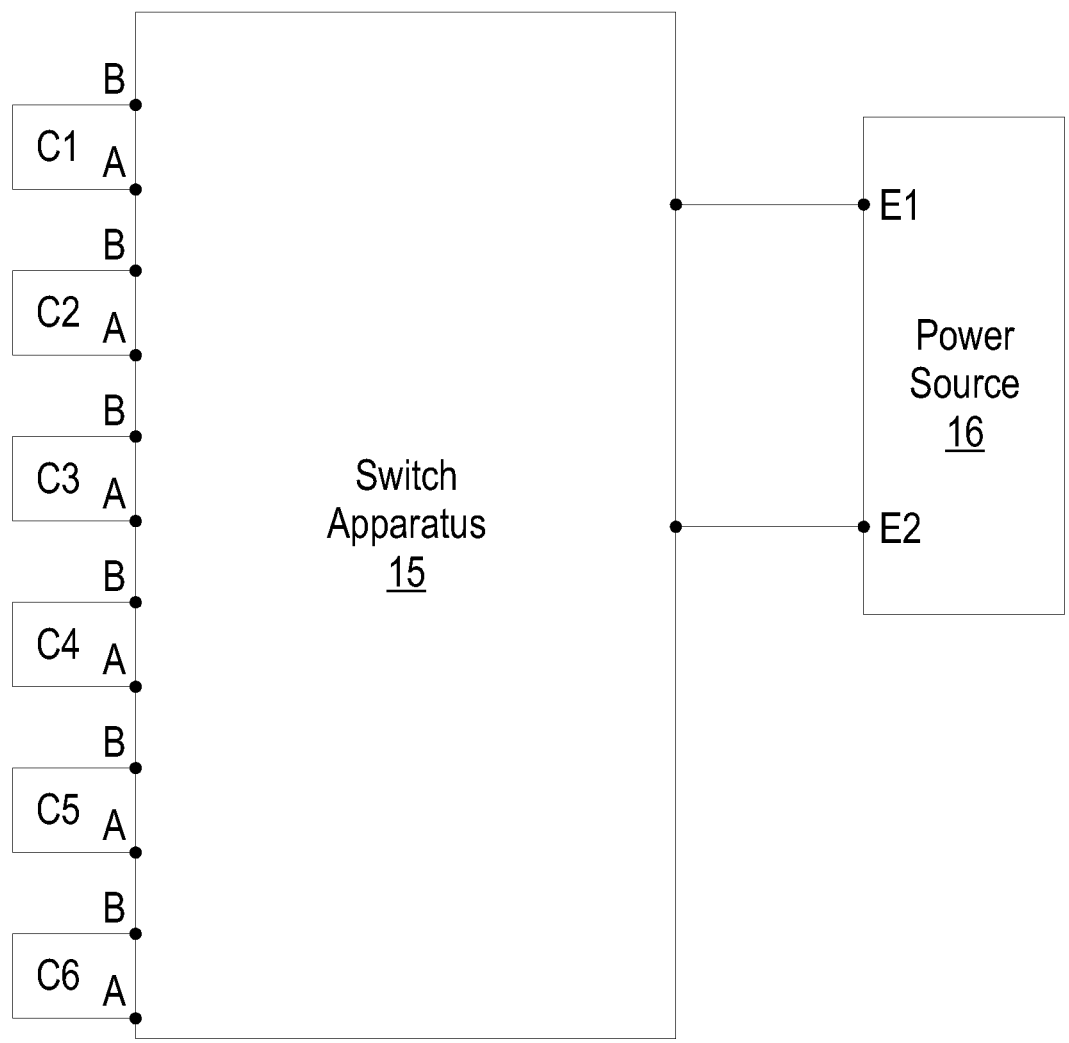
FIG. 9A is a schematic diagram showing an apparatus comprising six coils, a power source, and a switch apparatus, in accordance with embodiments of the present invention.

FIG. 9A is a schematic diagram showing an apparatus comprising six coils (C1, C2, C3, C4, C5, C6), the power source 16 (i.e., a battery having two electrodes E1 and E2), and the switch apparatus 15, in accordance with embodiments of the present invention. The electrodes E1 and E2 are configured to be at a constant electrical potential $\phi_1$ and $\phi_2$, respectively. The switch apparatus 15 is configured to dynamically establish electrical connections between the N coils (N=6 in FIG. 9A) and the electrodes E1 and E2 of the power source 16, such that only two adjacent coils are energized by the power source at any given time at which no other coils are energized.

Figure 9B:
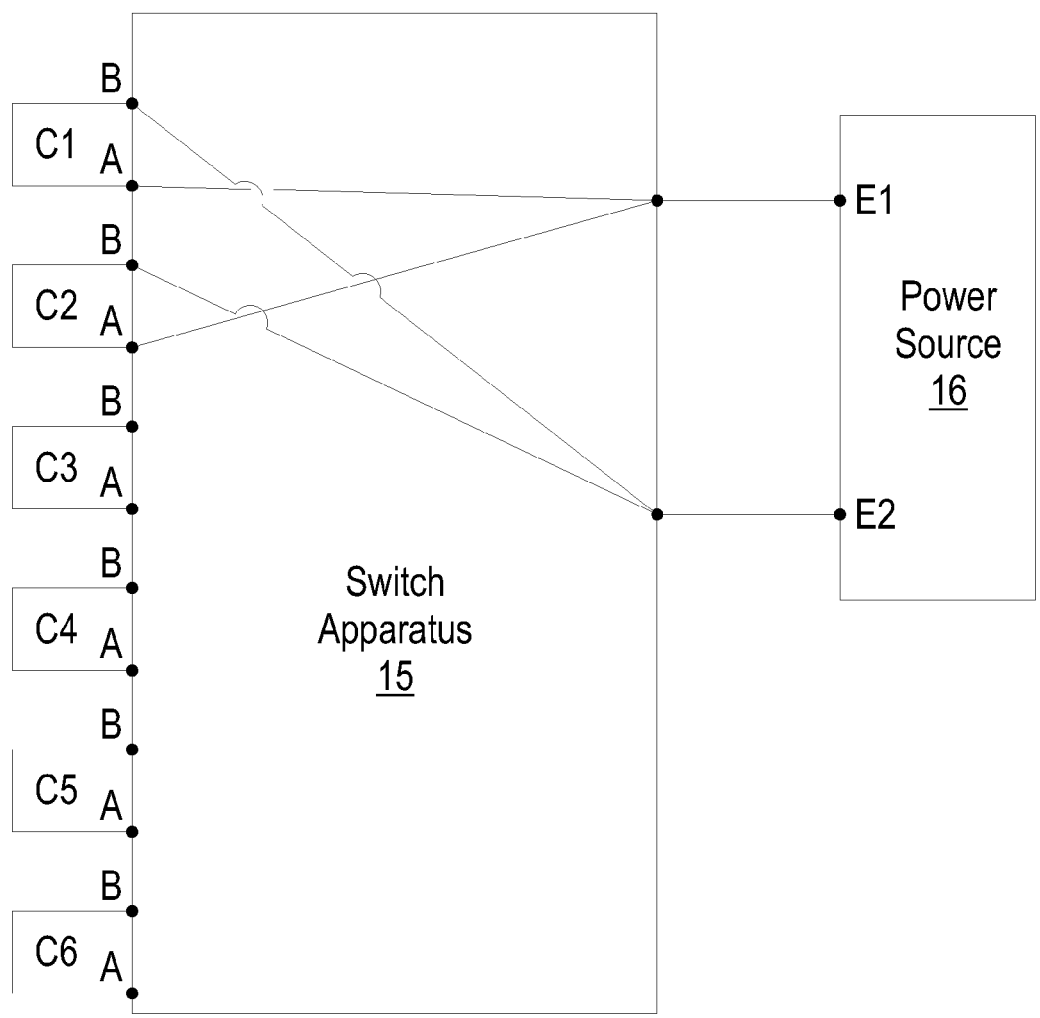
FIG. 9B depicts the apparatus of FIG. 9A after the switch apparatus implements electrical connections prescribed for two successive coils, in accordance with embodiments of the present invention.

FIG. 9B depicts the apparatus of FIG. 9A after the switch apparatus 15 implements electrical connections prescribed for two adjacent coils in the first row after the title in Table 1, in accordance with embodiments of the present invention. The first row after the title in Table 1 states that when the read head 44 is over the branch C1L of coil C1: terminal A of coil C1 and terminal A of coil C2 are connected to electrode E1 (having a constant electrical potential $\phi_1$) of the power source 16; and terminal B of coil C1 and terminal B of coil C2 are connected to electrode E2 (having a constant electrical potential $\phi_2$) of the power source 16 such that $\phi_1 \neq \phi_2$, and none of the other coils (C3, C4, C5, C6) are energized.

Note that the current provided by the power source is not constant but it is a time varying current that generates a time varying magnetic field to simulate the encoded data, namely a bit pattern, in a magnetic stripe of a conventional card. With the present invention, the bit pattern of this data is stored in a memory portion of the memory 14 (see FIG. 1) of the electronic card 10 and a bitstream of the bit pattern is loaded in a shift register or FIFO of the electronic card 10. The transmission of the data is triggered with a read head detector in the electronic card 10 and is initiated when the read head 44 of the card reader 34 is detected to be above the branch C1L. The stored current bitstream is then relayed to the pertinent coils via the switch apparatus 15.

The programmable field source 12 comprises at least one parallel data track 29 (see FIG. 4). In one embodiment, the programmable field source 12 comprises up to three parallel data tracks. For example, two or three coils built in parallel within the corresponding data tracks.

Figure 10:
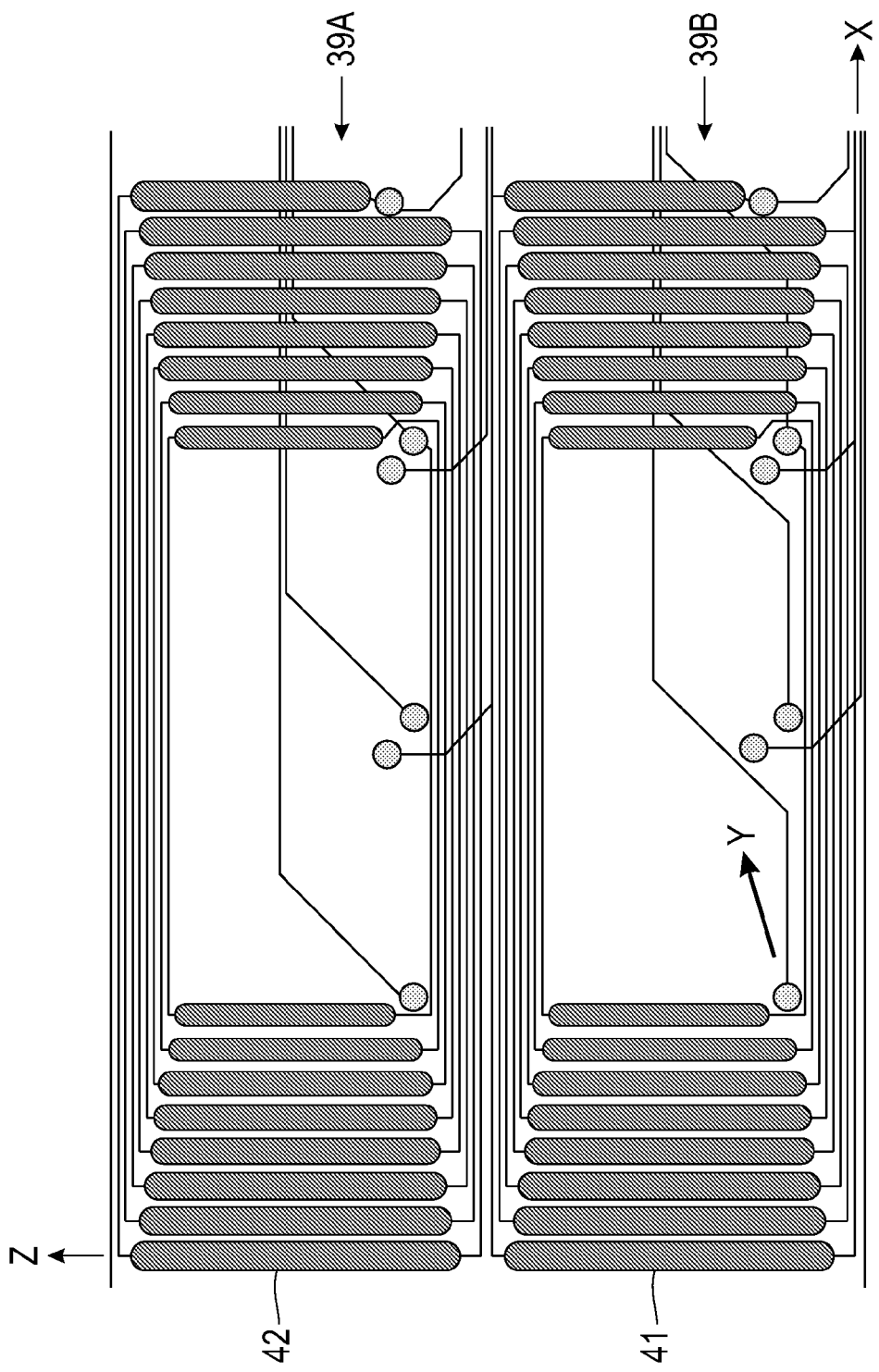
FIG. 10 shows two coils built in parallel for two parallel data tracks, in accordance with embodiments of the present invention.

FIG. 10 shows two coils 41 and 42 built in parallel for two parallel data tracks 39A and 39B, respectively, in accordance with embodiments of the present invention. If there are two or more data tracks, the card reader 34 reads each data track independently.

Figure 11:
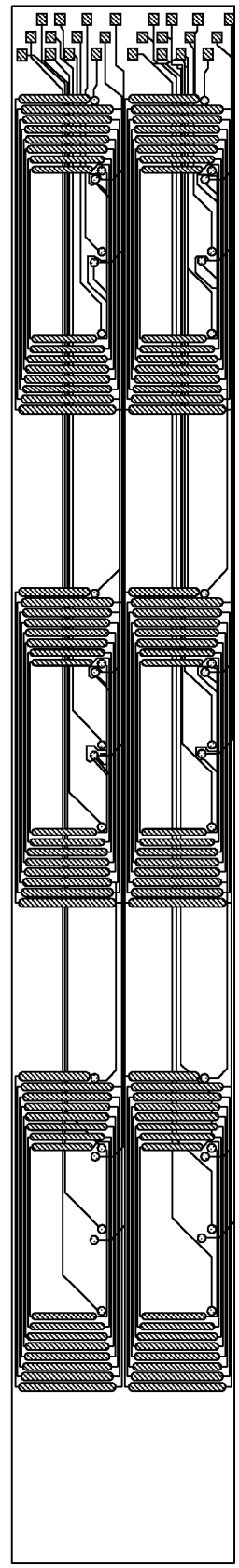
FIG. 11 shows the wiring of one of three layers in which three overlapping coils in two adjacent data tracks could be drawn in a lithography defined flex circuit, in accordance with embodiments of the present invention.

FIG. 11 shows the wiring of one of three layers in which three overlapping coils in two adjacent data tracks could be drawn in a lithography defined flex circuit, in accordance with embodiments of the present invention.

By energizing only two coils at a time, the present invention enables reading of data from the electronic card 10 by the card reader 34 to be performed with efficient use of the card energy, since all other coils are not energized while the two adjacent coils are being energized.

The preceding description of FIGS. 7A-11 described the embodiment of wire structures comprising overlapping coils.

Figure 16B:
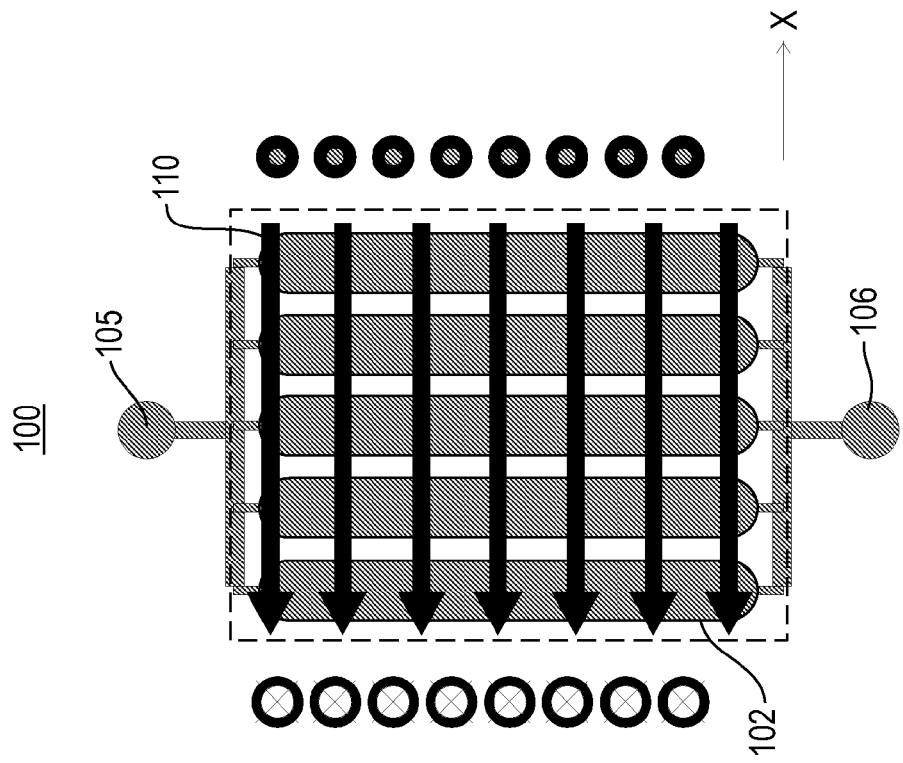
FIGS. 16A and 16B depict an individual set of flat wires connected in parallel, in accordance with embodiment of the present invention.
Figure 16A:
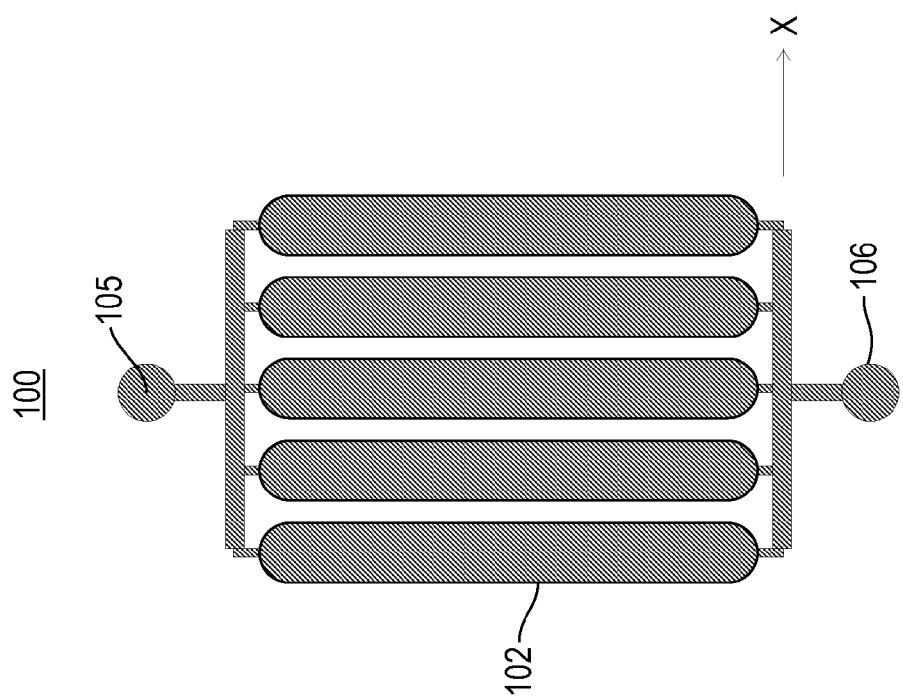
Figure 17:
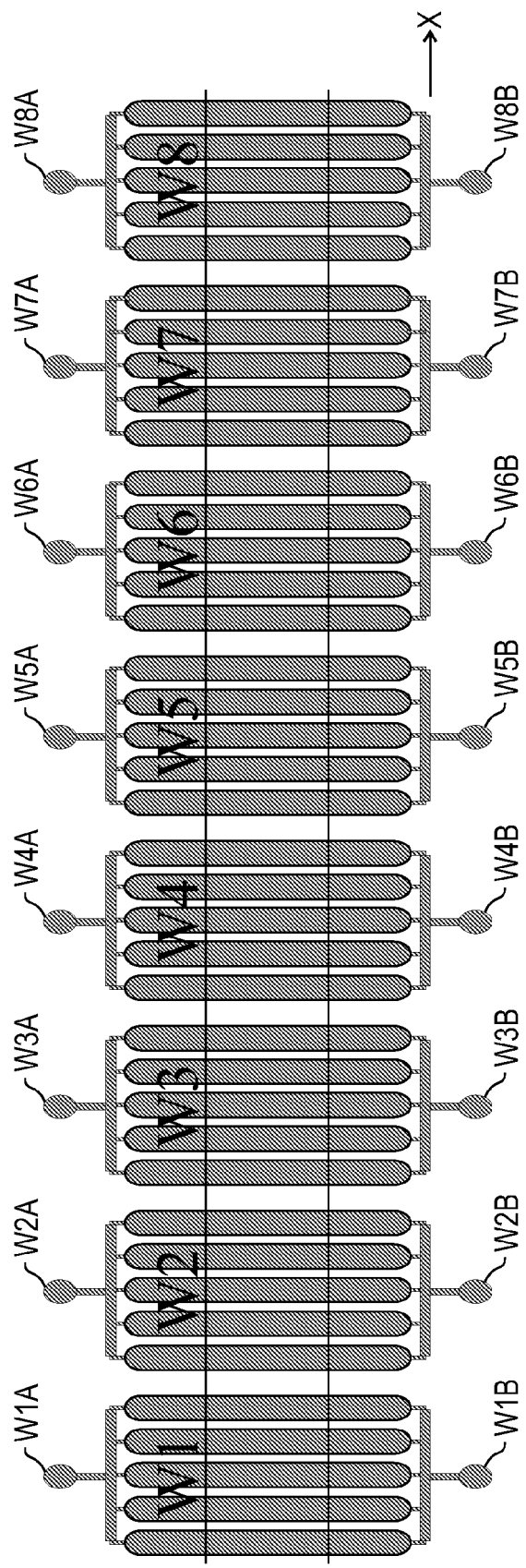
FIG. 17 depicts a wire apparatus comprising a plurality of adjacent sets of flat wires connected in parallel, in accordance with embodiment of the present invention.
Figure 18:
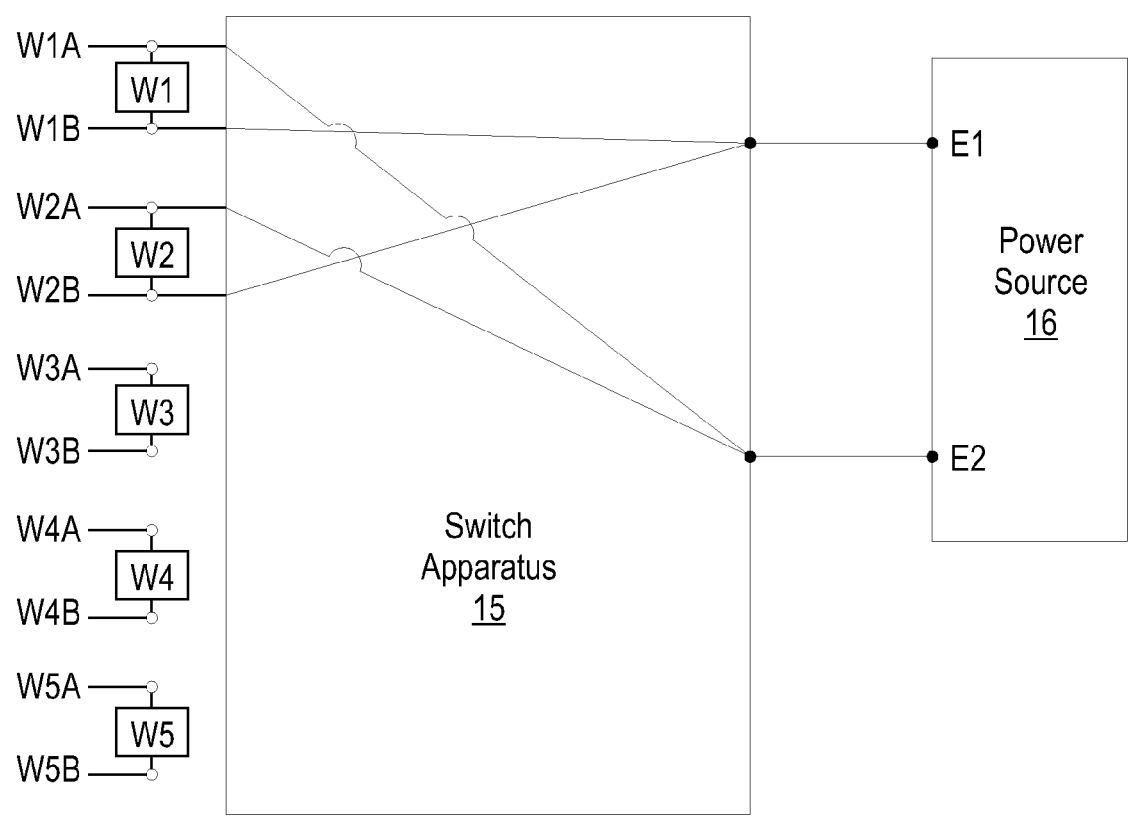
FIG. 18 depicts the wire apparatus of FIG. 17 after a switch apparatus implements electrical connections prescribed for two successive sets of wires, in accordance with embodiments of the present invention.

The following description of FIGS. 16-18 will describe the embodiment of wire structures comprising adjacent sets of flat wires connected in parallel.

FIGS. 16A and 16B (collectively, "FIG. 16") depict an individual set 100 of flat wires 102 connected in parallel, in accordance with embodiment of the present invention. The set 100 generally comprises a plurality of flat wires. When current flows from the contact 105 to the contact 106 (positive current), magnetic fields 110 are generated above the plane of the flat wires 102 in −X direction. With a positive current (i.e., current flowing from contact 105 to contact 106), the magnetic field points in the −X direction (i.e., Hx=−H) above the set of parallel flat wires 102. The amplitude of the magnetic field H is given by H~n'*i/2 with n' being the density of wires 102 and i being the current in each wire. If the polarity of the current is inverted, the field directions are also inverted.

FIG. 17 depicts a wire apparatus 120 comprising a plurality of adjacent sets of flat wires connected in parallel, in accordance with embodiment of the present invention. The plurality of flat wires in FIG. 17 consists of 8 sets of flat wires denoted as W1, W2, W3, W4, W5, W6, W7, and W8. Set Wn of flat wires has a positive terminal Wn(A) and a negative terminal Wn(B) (n=1, 2, . . . , 8). Each set of flat wires in FIG. 17 is similar to the set 100 in FIG. 16 and produces similar magnetic fields when a current is applied between contact 105 and 106. With usage of the wire structure of FIG. 17 during the card swipe, the card reader will move above each of the parallel wire structures sequentially.

Since only the magnetic field source under the read head matters, it is not necessary to energize all sets of flat wires at the same time. The present invention includes the detection of the position of the reader above the wire structures, which is accomplished by monitoring the effective impedance of the wires or by a separate method for sensing the magnetic field change due to the presence of the permeable material in the read head.

To avoid a discontinuity of the magnetic field Hx when the read head moves from one set of flat wires to the next set of flat wires, the two sets of flat wires are energized at the same time. By energizing the wire structures in the preceding manner, it is ensured that the read head does not sense a change in magnetic field due to the transition between sets of flat wires but only due to a variation in the time-dependent currents flowing through the parallel wires. The sets of parallel wires can be energized in a defined sequence to always provide the necessary magnetic field at the gap of the read head. This defined sequence depends on the position of the read head above the wire structure. This is implemented using the switch apparatus 150 (e.g., a multiplexer) (see FIG. 18) that has as an input an indexed position of the read head above wire structure. The switch apparatus connects two sets of parallel wires at the same time to the power source. The sequence is defined in the Table 2 infra.

TABLE 2

| Detected Position of Card Reader | Coil Structure To Power Source Connections: positive electrode of the power source | Coil Structure To Power Source Connections: negative electrode of the power source |
| --- | --- | --- |
| W1 | W1(A) and W2(A) | W1(B) and W2(B) |
| W2 | W2(A) and W3(A) | W2(B) and W3(B) |
| W3 | W3(A) and W4(A) | W3(B) and W4(B) |
| W4 | W4(A) and W5(A) | W4(B) and W5(B) |
| etc. | | |

The current provided by the power source to the flat wires is not constant but is time varying as explained previously. The current contains the information of the card and emulates the signal that would be encoded in a magnetic stripe. This information is stored in a chip of the smart card. Prior to the swipe, this bit stream that needs to be sent out (or equivalent current level) is stored in a shift register or FIFO. The transmission of the data is triggered with the read head detector. The data transmission is initiated when the read head is detected to be above the set W1. The stored current bit stream is then relayed to the adequate set of parallel wires via the switch apparatus.

FIG. 18 depicts the wire apparatus of FIG. 17 after the switch apparatus 15 implements electrical connections prescribed for two successive sets of wires, in accordance with embodiments of the present invention. FIG. 18 is analogous to FIG. 9, wherein the switch apparatus 15 of FIG. 18 corresponds to the switch apparatus 15 of FIG. 9B, the power source 16 of FIG. 18 corresponds to the power source 16 of FIG. 9B, and the set of flat wires Wn corresponds to the left or the right branch of the coil Cn of FIG. 9, the terminal Wn(A) of FIG. 18 corresponds to the terminal A of FIG. 9, and the terminal Wn(B) of FIG. 18 corresponds to the terminal B of FIG. 9 (n=1, 2, . . . ).

In one embodiment, the present invention discloses how the electrical currents may be reduced to further improve efficient energy usage in the reading of data from the electronic card 10 by the card reader 34. Card readers use inductive read heads and the amplitude of their readback signal is proportional to the time derivative of the magnetic field. Use of the programmable field source 12 (see FIG. 1) may be implemented through use of coils, a solenoid or a solenoid with magnetic core. In all cases, the amplitude of the magnetic field is proportional to the current in the coils. The readback signal, which is a voltage signal, is thus proportional to the time derivative of the current in the coil.

The signal voltage amplitude requirement is set by ISO/IEC 7811-6 and 7 norms. This requirement states that overshoot and undershoot of the voltage of the readback signal are permitted but the voltage associated with overshoot and undershoot must not exceed a product of f and the maximum amplitude of the readback signal ($V_{max}$) that occurs at the transition, wherein f is an overshoot ratio specified in the specifications of the card reader. The overshoot ratio f is defined as $V_{th}/V_{max}$, wherein $V_{th}$ is a peak voltage threshold of the readback signal above which a bit transition (0 to 1 or 1 to 0) is interpreted as having occurred in the data 25 (see FIG. 1), and wherein $V_{max}$ is a maximum voltage that could occur if noise and statistical errors were absent. Generally, $V_{th} < V_{max}$ and f<1. By tailoring the current waveform, the present invention effectively reduces the energy required to generate the magnetic fields that encode the data 25 and still conform the specifications of the card reader, with respect to f, for the readback signal.

FIGS. 12A and 12B depict exemplary waveforms of electric current (71A and 72A) according to the present invention in comparison with a standard current waveform (71B and 72B). After a transition between successive bits of the data 25 (see FIG. 1), the electric current is reduced slowly towards zero and increased slowly back to its maximum value (+$I_0$) in waveforms 71A and 72A before the next transition. The electrical current flowing in the coil structure can be reduced, which reduces electrical power and energy consumption. The slope of the waveforms 71A and 72A (between transitions) needs to be such that the generated voltage signal (which is proportional to the time derivative dH/dt of the magnetic field H) is less than the peak threshold voltage level $V_{th}$ (comparable to a noise level) allowed by the specifications of the card reader and used in the reader detection algorithms. The overshoot ratio f, which is specified in the card specifications, sets the constraints in accordance with Equation (1) on the slope ΔI/Δt of the waveforms 71A and 72A of the electric current between transitions.

$$0 < |\Delta I/\Delta t| \leq |\Delta I/\Delta t|_{max} \qquad (1)$$

wherein $|\Delta I/\Delta t|_{max} = f^*(2I_0/\Delta t_{sw})$, and wherein $2I_0/\Delta t_{sw}$ is the maximum signal amplitude of the waveform, $I_0$ is the maximum electrical current that can be attained, and $\Delta t_{sw}$ is the minimum current driver switching time to change the current from $-I_0$ to $+I_0$. Note that $f^*(2I_0/\Delta t_{sw})$ in Equation (1) is a maximum time derivative of electrical current corresponding to the peak voltage threshold ($V_{th}$) and the overshoot ratio (f) for the card reader. Thus, Equation (1) states that the time derivative of current does not exceed a maximum e derivative of current corresponding to a peak voltage threshold of the card reader.

Equation (1) requires that the time derivative of electrical current be a finite time derivative (i.e., the magnitude of ΔI/Δt denoted as |ΔI/Δt| exceeds 0), since the case of ΔI/Δt=0 corresponds to the standard current waveforms 71B and 72B. The finite time derivative of electrical current is generated at times when no finite time derivative of electrical current is logically required for generating the time varying magnetic field.

In order to satisfy Equation (1), ΔI/Δt satisfies Equation (2):

$$|\Delta I/\Delta t| = h|\Delta I/\Delta t|_{max} \qquad (2)$$

wherein 0<h≤1. Noting that h may have any positive value not exceeding 1, exemplary values for h are 0.3, 0.4, 0.5, 0.6, 0.7, 0.8, 0.9, 0.95, and 0.99.

It is possible to calculate the normalized power (R<$I^2$>)/(R$I_0^2$) and energy (R<$I^2$>$t_{bt}$)/(R$I_0^2$) and derive the gain as a function of $\Delta t_{sw}/t_{bt}$ for a given overshoot ratio f, wherein R is the resistance of the solenoid, $t_{bt}$ the time duration between two transitions, and $\Delta t_{sw}$ as defined supra is the slope of the current used to emulate a magnetic transition.

Figure 13A:
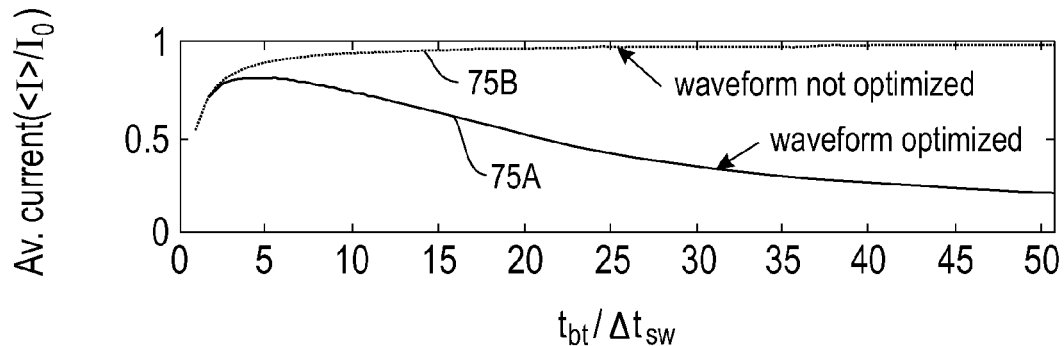
FIGS. 13A, 13B, and 13C graphically illustrate a reduction in current, power, and energy, respectively, resulting from tailoring the current waveform in accordance with the present invention.
Figure 13B:
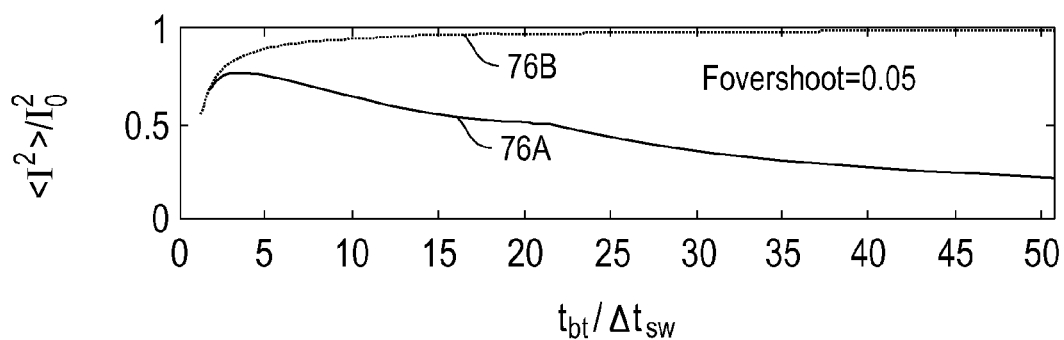
Figure 13C:
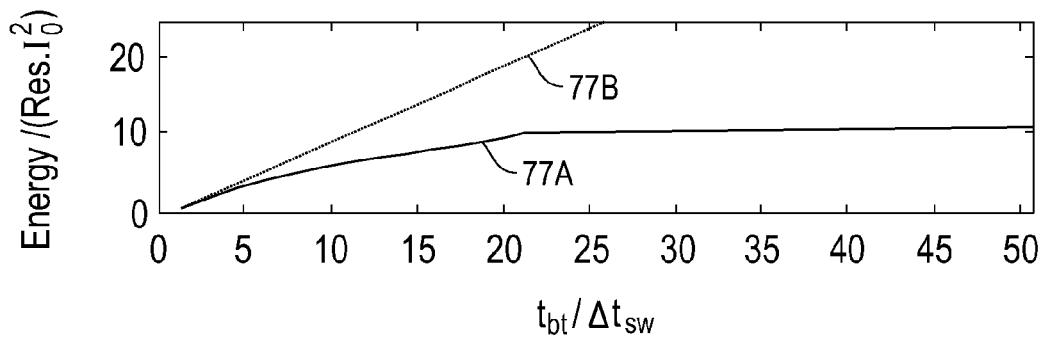

FIGS. 13A, 13B, and 13C graphically illustrate a reduction in current, power, and energy, respectively, resulting from tailoring the current waveform in accordance with Equation (1) or (2) of the present invention. In FIG. 13A, the electrical current 75A resulting from application of Equation (1) and the standard electrical current 75B of the prior art are plotted against $t_{bt}/\Delta t_{sw}$. In FIG. 13B, the power 76A resulting from the electrical current 75A of FIG. 13A and the power 76B resulting from the electrical current 75B of FIG. 13A are plotted against $t_{bt}/\Delta t_{sw}$. In FIG. 13C, the energy consumption 77A resulting from the electrical current 75A of FIG. 13A and the energy consumption 77B resulting from the electrical current 75B of FIG. 13A are plotted against $t_{bt}/\Delta t_{sw}$. Specifically, the quantity Energy/(Res*$I_0^2$) is plotted against $t_{bt}/\Delta t_{sw}$ in FIG. 13C, wherein Res denotes electrical resistance through which the electrical current flows.

It is to be noted that the preceding technique of limiting a finite time derivative of current to less than or equal to $(\Delta I/\Delta \tau)_{max}$ results in power and energy reductions in addition to the power and energy reductions resulting from energizing only two coils (or sets of parallel wires) at a time according to the present invention. In addition, the preceding technique of limiting a finite time derivative of current to less than or equal to $(\Delta I/\Delta \tau)_{max}$ may be used for power and energy reductions even if energizing only two coils (or sets of parallel wires) at a time is not utilized, in which case the electrical currents are driven by the power source 16 into one or more wires generally such that each wire may have the geometry of a coil or any other geometry such as parallel wires.

Figure 14:
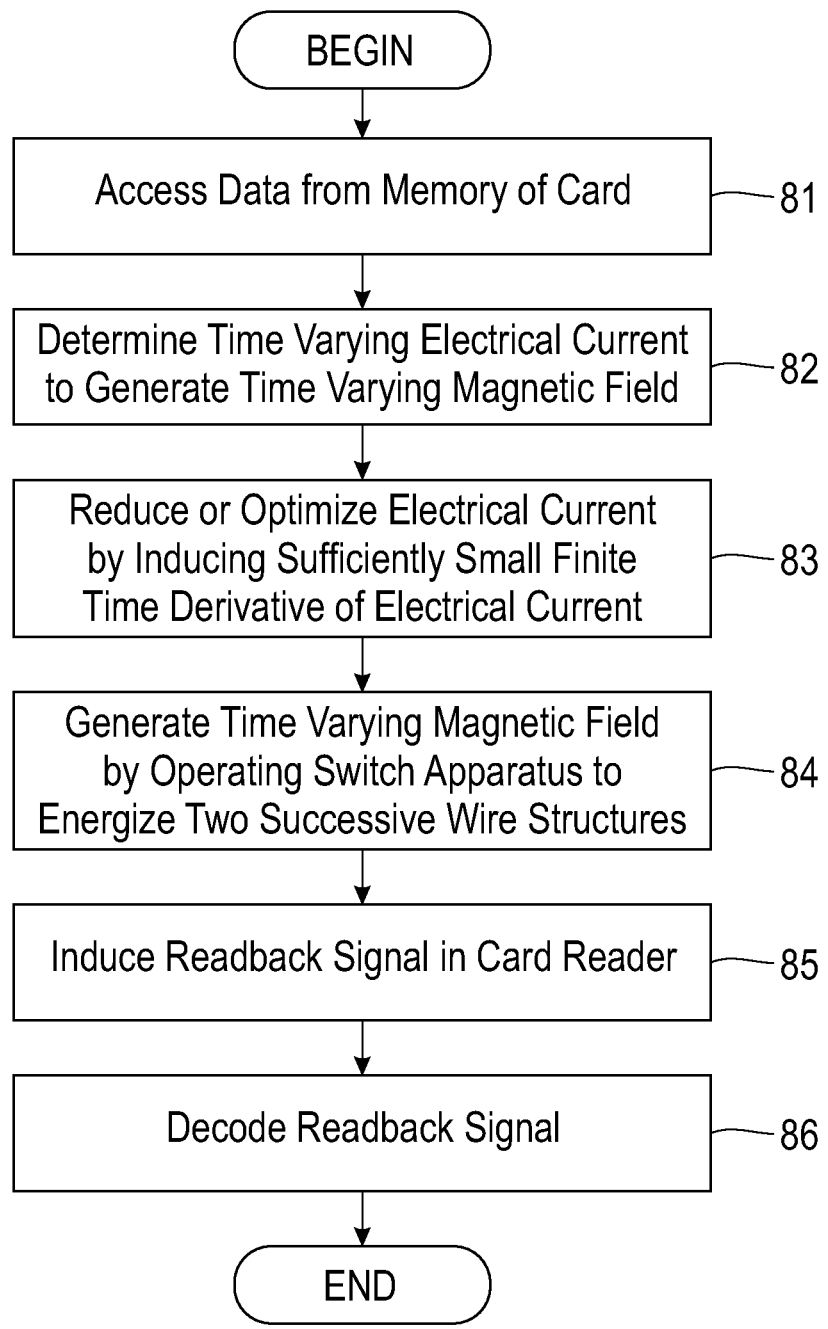
FIG. 14 is a flow chart for describing a first method of processing data stored in an electronic card, in accordance with embodiments of the present invention.

FIG. 14 is a flow chart for describing a first method of processing data stored in an electronic card, in accordance with embodiments of the present invention. The flow chart of FIG. 14 comprises steps 81-86.

In step 81, the processor 13 (see FIG. 1) accesses a sequence of binary bits, for each data track of at least one data track 29, from the memory 14 of the electronic card 10.

In step 82, the processor 13 determines a time varying electrical current configured to flow in two adjacent wire structures of N wire structures (N at least 3) disposed in the at least one data track 29 to generate a time varying magnetic field that encodes the sequence of binary bits accessed in step 81.

In one embodiment, step 83 is performed to further tailor the electrical current with the addition of a finite time derivative of electrical current in each wire structure of the two adjacent wire structures at times when no finite time derivative of electrical current is logically required for generating the time varying magnetic field, wherein a magnitude of the finite time derivative of electrical current does not exceed a specified maximum time derivative of electrical current corresponding to a peak voltage threshold ($V_{th}$) and an overshoot ratio (f) of the card reader. In one embodiment, the maximum time derivative is $f^*(2I_0/\Delta t_{sw})$, wherein $I_0$ is a maximum electrical current that can be driven through each wire structure, and wherein ($t_{sw}$) is a minimum switching time to change an electrical current through each wire structure from $-I_0$ to $+I_0$. Step 83 results in reducing or optimizing the electrical current and may be performed by the processor 13.

In step 84, a time varying magnetic field is generated by operating the switch apparatus 15 to energize two adjacent wire structures by driving the time varying electrical current determined in step 82, or steps 82 and 83, through the two adjacent wire structures. The processor 13 controls generation of the time varying magnetic field that encodes the accessed sequence of binary bits for each data track 29 as the card 10 is swiped in a X direction through a card reader 34. The time varying magnetic field induces a readback signal in the card reader 34 in step 85.

The electronic card 10 comprises a substrate 11, the processor 13 disposed in the substrate 11, the at least one data track 29 disposed in the substrate 11 such that each data track is oriented in the X direction, the memory 14 disposed in the substrate 11, a switch apparatus 15 disposed in the substrate 11, N wire structures disposed in each data track and optionally stacked in a Z direction that is normal to the X direction such that N is at least 3, and a power source 16 disposed in the substrate 11. In different embodiments, the N wire structures are either N overlapping coils connected in series or N sets of flat wires connected in parallel.

In the overlapping coils embodiment, successive coils of the N coils overlap each other in the Z direction and are displaced from each other in the X direction.

The power source 16 provides electrical power to the processor 13, the switch apparatus 15, and the N wire structures in each data track.

The processor 13 controls the generation of the time varying magnetic field by operating the switch apparatus 15 to electrically couple two adjacent wire structures of the N wire structures in each data track 29 to the power source and to electrically decouple all other structures of the N structures from the power source to cause the power source 16 to generate a voltage drop that drives about a same electrical current through each wire structures of the two adjacent wire structure (but no electrical current through any other wire structure of the N wire structures), which generates the time varying magnetic field at the two successive wire structures but not at any other wire structures of the N wire structures.

In step 85, the readback signal is induced in the card reader.

Step 86 decodes the readback signal induced in the card reader to determine the sequence of binary bits accessed in step 81.

In one embodiment, the time varying magnetic field is essentially spatially constant above the two adjacent wire structures and at the transition between the two adjacent wire structures.

In one embodiment, each wire structures of the N wire structures in each data track comprises essentially a same electrical resistance.

In one aspect of the overlapping coils embodiment, a coil of the N coils in each data track comprises an outer ring and an interior void, wherein an outermost boundary of the outer ring is an outer envelope of the coil, wherein an innermost boundary of the outer ring is an inner envelope of the coil.

In one aspect of the overlapping coils embodiment, the N coils in each data track are denoted as coil 1 (C1), coil 2 (C2), ..., coil N (CN), The outer ring of coil Cn (n=1, 2, ..., N) comprises branches that consist of a left branch denoted as CnL and a right branch denoted as CnR such that the interior void of coil Cn is disposed between and in direct mechanical contact with the left branch CnL and the right branch CnR. There is no overlap between the branches of different coils of the N coils. The branches of the N coils are in an ordered sequence in the X direction of C1L, C2L, C3L, C1R, C2R, C3R, ..., C(3j-2)L, C(3j-1)L, C(j))L, C(3j-2)R, C(3j-1)R, C(3j)R, ... C(3J-2)L, C(3J-1)L, C(J))L, C(3J-2)R, C(3J-1)R, C(3J)R. The preceding sequence of the branches of the N coils comprises J groups of 3 overlapping coils in each group (i.e., j=1, 2, ..., J), wherein J=N/3. A first branch and a second branch of each two consecutive branches in the ordered sequence are positioned such that a minimum X coordinate of the second branch and a maximum X coordinate of the first branch are aligned in the Z direction to define an interface between the first and second branches.

In one embodiment, for n=1, 2, ..., N-1, the processor 13 controls the time varying current by: ascertaining that the card reader is in a spatial position that enables the readback signal to be induced in the card reader from the time varying magnetic field generated by the electrical current in one branch CnI of the coil Cn (or in a wire set Wn); and responsive to said ascertaining that the card reader is in the spatial position, the processor 13 operates the switch apparatus 15 to electrically couple the two adjacent coils Cn and Ck which has a branch CkJ (k=1, 2, ... N and J=R or L) placed right after the branch CnI in the X direction (or in the adjacent sets of parallel wires Wn and W(n+1)) to the power source 16 and to electrically decouple all other coils (or wire sets) of the N coils (or wire sets) from the power source 16 to cause the power source 16 to drive the electrical current through the two adjacent coils Cn and Ck (or wire sets Wn and W(n+1)) and through no other coil (or wire set) of the N coils (or wire sets).

In one aspect of the overlapping coils embodiment, the processor 13 operates the switch apparatus to electrically couple the two adjacent coils to the power source 16 in a manner that results in electrical currents in the two successive branches positioned under the card reader of about equal magnitude and same direction with respect to the Y direction.

In one aspect of the overlapping coils embodiment, the processor 13 operates the switch apparatus to electrically couple the two adjacent coils to the power source 16 in a manner that results in electrical currents of about equal magnitude and same direction in the two successive about a null magnetic field in the Z direction at the interface between the two successive branches of the two adjacent coils.

Figure 15:
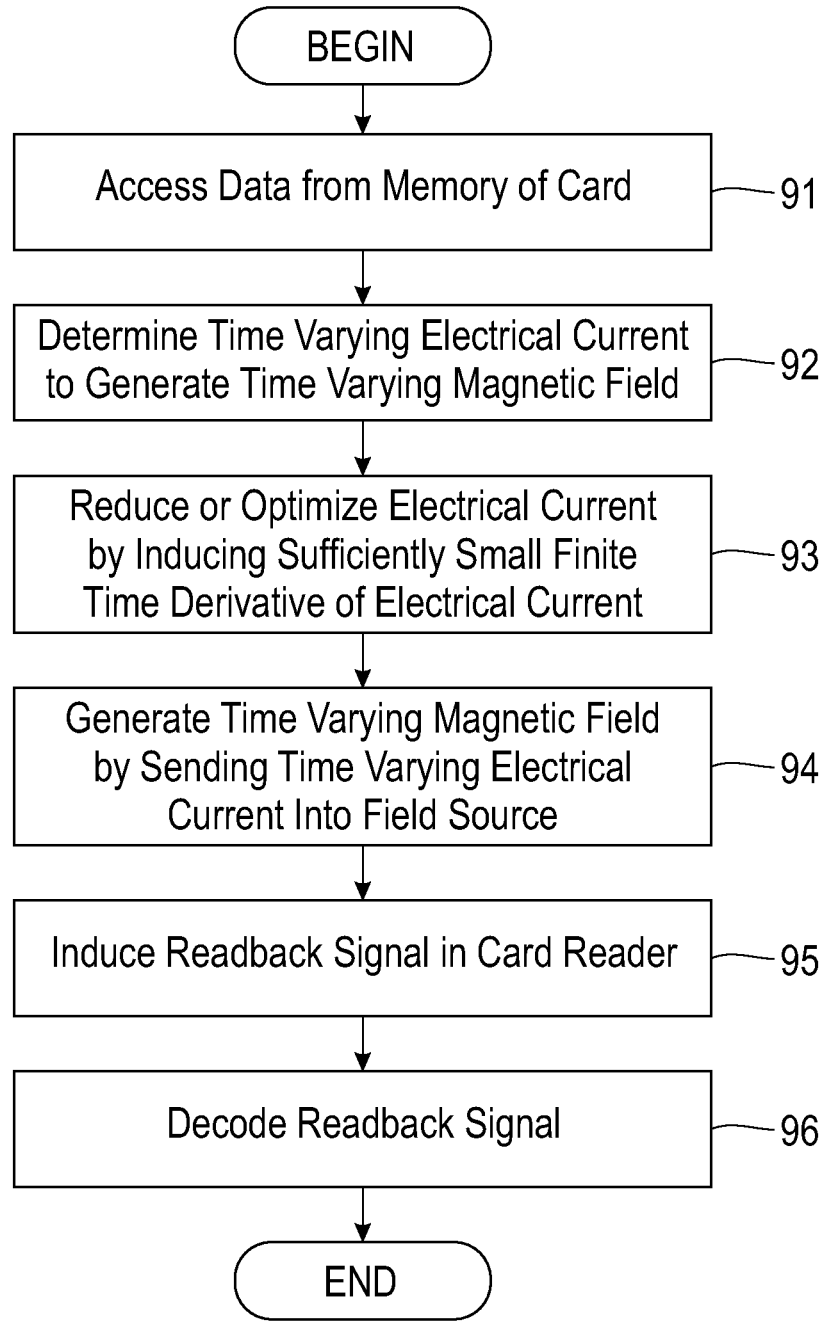
FIG. 15 is a flow chart for describing a second method of processing data stored in an electronic card, in accordance with embodiments of the present invention.

FIG. 15 is a flow chart for describing a second method of processing data stored in an electronic card, in accordance with embodiments of the present invention. The flow chart of FIG. 15 comprises steps 91-96.

The method of FIG. 3 utilizes an electronic card 10 which comprises a substrate 11, the processor 13 disposed in the substrate 11, the at least one data track 29 disposed in the substrate 11 such that each data track is oriented in the X direction, the memory 14 disposed in the substrate 11, at least one wire disposed in the substrate 11, and a power source 16 disposed in the substrate 11 (see FIGS. 1 and 2). The power source 16 provides electrical power to the processor 13 and the at least one wire.

In step 91, the processor 13 (see FIG. 1) accesses a sequence of binary bits, for each data track of at least one data track 29, from the memory 14 of the electronic card 10.

In step 92, the processor 13 determines a time varying electrical current configured to flow in at least one wire disposed in the at least one data track 29 to generate a time varying magnetic field that encodes the sequence of binary bits accessed in step 91.

Step 93 tailors the electrical current with the addition of a finite time derivative of electrical current in the at least one wire at times when no finite time derivative of electrical current is logically required for generating the time varying magnetic field, wherein a magnitude of the finite time derivative of electrical current does not exceed a specified maximum time derivative of electrical current corresponding to a peak voltage threshold ($V_{th}$) and an overshoot ratio (f) of the card reader. In one embodiment, the maximum time derivative is $f*(2I_0/\Delta t_{sw})$, wherein $I_0$ is a maximum electrical current that can be driven through each wire structure, and wherein ($t_{sw}$) is a minimum switching time to change an electrical current through each wire structure from $-I_0$ to $+I_0$. Step 93 results in reducing or optimizing the electrical current and may be performed by the processor 13.

In step 94, a time varying magnetic field is generated by sending the time varying electrical current determined in steps 92 and 93 into the field source 15 by driving the time varying electrical current determined in steps 92 and 93 through the at least one wire. The processor 13 controls generation of the time varying magnetic field that encodes the accessed sequence of binary bits for each data track 29 as the card 10 is swiped in a X direction through a card reader 34. The time varying magnetic field induces a readback signal in the card reader 24 in step 95.

Said generating the time varying magnetic field comprises generating a voltage drop that drives an electrical current through the at least one wire to generate the time varying magnetic field.

In step 95, the readback signal is induced in the card reader.

Step 96 decodes the readback signal induced in the card reader to determine the sequence of binary bits accessed in step 91.

The processor 13 may be used to perform the control functions of the electronic card 10, including controlling performance of steps 81-86 of the flow chart of FIG. 14 and controlling performance of steps 91-96 of the flow chart of FIG. 15. The processor 13 may execute the program code 26 (see FIG. 1) to perform the processor's control functions. The program code 26 may be hard-wired in the memory 14 or alternatively may be modifiable or replaceable in the memory 14.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing data stored in an electronic card, said method comprising:
   accessing a sequence of binary bits, for each data track of at least one data track, from a memory in the electronic card;
   determining a time varying electrical current configured to flow in two adjacent wire structures of N wire structures disposed in each data track of the at least one data track to generate a time varying magnetic field that encodes the sequence of binary bits, N being at least 3; and
   generating the time varying magnetic field as the card is swiped through a card reader in a minus X direction by driving the time varying electrical current through the two adjacent wire structures, said time varying magnetic field inducing a readback signal in the card reader;
   wherein the card comprises a substrate, a processor disposed in the substrate, the at least one data track disposed in the substrate such that each data track is oriented in the X direction, the memory disposed in the substrate, a switch apparatus disposed in the substrate, the N wire structures disposed in each data track, and a power source disposed in the substrate,
   wherein the power source provides electrical power to the processor, the switch apparatus, and the N wire structures disposed in each data track,
   wherein said generating the time varying magnetic field comprises said processor operating the switch apparatus with respect to the N wire structures,
   wherein said operating the switch apparatus comprises electrically coupling the two adjacent wire structures of the N wire structures in each data track to the power source and to electrically decoupling all other wire structures of the N wire structures from the power source, and
   wherein said electrically coupling the two adjacent wire structures and said electrically decoupling all other wire structures causes the power source to generate a voltage drop that drives the time varying electrical current through each wire structure of the two adjacent wire structures but no electrical current through any other wire structure of the N wire structures, which generates the time varying magnetic field above each wire structure of the two adjacent wire structures but not above any other wire structures of the N wire structures.

2. The method of claim 1, wherein the N wire structures are N coils and the two adjacent wire structures consist of two adjacent coils of the N coils, wherein the N coils consist of at least one group of coils, wherein the coils in each group of coils are stacked in a Z direction normal to the X direction, and wherein the coils in each group of coils overlap each other in the Z direction and are displaced from each other in the X direction such that a minimum and maximum X coordinate for the X direction of spatially successive coils in each group of coils increases.

3. The method of claim 2, wherein the time varying magnetic field is essentially spatially constant above each coil of the two adjacent coils and at a transition between the two adjacent coils.

4. The method of claim 3, wherein each coil of the N coils in each data track comprises essentially a same electrical resistance.

5. The method of claim 2,
   wherein a coil structure associated with the coil of each coil of the N coils in each data track comprises an outer ring and an interior void,
   wherein an outermost boundary of the outer ring is an outer envelope of the coil,
   wherein an innermost boundary of the outer ring is an inner envelope of the coil,
   wherein the interior void is devoid of the coil and has an outermost boundary that coincides with the innermost boundary of the outer ring,
   wherein the N coils in each data track are denoted as coil 1 (C1), coil 2 (C2), . . . , coil N (CN), wherein the outer ring of coil Cn (n=1, 2, . . . , N) comprises branches that consist of a left branch denoted as CnL and a right branch denoted as CnR such that the interior void of coil Cn is disposed between and in direct mechanical contact with the left branch CnL and the right branch CnR,
   wherein there is no overlap between the branches of different coils of the N coils,
   wherein the branches of the N coils are in an ordered sequence in the X direction of C1L, C2L, C3L, C1R, C2R, C3R, . . . , C(N-2)L, C(N-1)L, C(N)L, C(N-2)R, C(N-1)R, C(N)R, and
   wherein a first branch and a second branch of each two consecutive branches in the ordered sequence are positioned such that a minimum X coordinate of the second branch and a maximum X coordinate of the first branch are aligned in the Z direction to define an interface between the first and second branches.

6. The method of claim 5, wherein for n=1, 2, . . . , N−1, said processor controlling the time varying magnetic field comprising:
   said processor ascertaining that the card reader is in a spatial position that enables the readback signal to be induced in the card reader from the time varying magnetic field generated by the electrical current in a branch CnI (I=R or L) of the coil Cn; and
   responsive to said ascertaining, said processor operating the switch apparatus to electrically couple the two adjacent coils Cn and Ck, wherein the coil Ck has a branch CkJ (k=2, . . . , N and J=R or L) placed right after the branch CnI in the X direction, to the power source and to electrically decouple all other coils of the N coils from the power source to cause the power source to drive the electrical current through the two adjacent coils Cn and Ck and through no other coil of the N coils.

7. The method of claim 6, wherein said processor operating the switch apparatus comprises said processor electrically coupling the two adjacent coils Cn and Ck to the power source in a manner that results in electrical currents in the branches CnI and CkJ of about equal magnitude and same direction with respect to a Y direction normal to both the X direction and the Z direction.

8. The method of claim 1, wherein said generating the time varying magnetic field comprises generating a finite time derivative of electrical current in each coil of the two adjacent coils at times when no finite time derivative of electrical current is logically required for generating the time varying magnetic field, and wherein a magnitude of the finite time derivative of electrical current does not exceed a specified maximum time derivative of electrical current corresponding to a peak voltage threshold ($V_{th}$) and an overshoot ratio (f) of the card reader.

9. The method of claim 8, wherein the maximum time derivative is $f*(2I_0/\Delta t_{sw})$, wherein $I_0$ is a maximum electrical current that can be driven through each coil, and wherein $\Delta t_{sw}$ is a minimum switching time to change an electrical current through each coil from $-I_0$ to $+I_0$.

10. The method of claim 1, wherein the N wire structures are N sets of flat wires connected in parallel, and wherein each set of the N sets of flat wires comprises a plurality of flat wires.

11. An electronic card, comprising:
a substrate;
at least one data track disposed in the substrate, each data track oriented in a X direction;
a processor disposed in the substrate;
a sequence of binary bits for each data track stored in a memory within the substrate;
a switch apparatus disposed in the substrate;
N coils disposed in each data track and stacked in a Z direction normal to the X direction, said N at least 3, successive coils of the N coils overlapping each other in the Z direction and displaced from each other in the X direction such that a minimum and maximum X coordinate for the X direction of successive coils increases; and
a power source disposed in the substrate, said power source configured to provide electrical power to the processor, the switch apparatus, and the N coils in each data track,
said processor configured generate a time varying magnetic field including being configured to operate the switch apparatus, as the card is being swiped through the card reader in the minus X direction, to electrically couple two adjacent coils of the N coils in each data track to the power source and to electrically decouple all other coils of the N coils from the power source, which causes the power source to generate a voltage drop that drives about a same electrical current through each coil of the two adjacent coils but no electrical current through any other coil of the N coils to generate the time varying magnetic field above the two adjacent coils but not above any other coil of the N coils, and
wherein the time varying magnetic field for each data track is configured to encode the sequence of binary bits for each data track and to induce a readback signal in the card reader.

12. The electronic card of claim 11, wherein the processor is configured to generate the time varying magnetic field to be essentially spatially constant above each coil of the two adjacent coils and at a transition between the two adjacent coils.

13. The electronic card of claim 12, wherein each coil of the N coils in each data track comprises essentially a same electrical resistance.

14. The electronic card of claim 11,
wherein a coil structure associated with each coil of the N coils in each data track comprises an outer ring and an interior void,
wherein an outermost boundary of the outer ring is an outer envelope of the coil,
wherein an innermost boundary of the outer ring is an inner envelope of the coil,
wherein the interior void is devoid of the coil and has an outermost boundary that coincides with the innermost boundary of the outer ring,
wherein the N coils in each data track are denoted as coil 1 (C1), coil 2 (C2), . . . , coil N (CN), wherein the outer ring of coil Cn (n=1, 2, . . . , N) comprises branches that consist of a left branch denoted as CnL and a right branch denoted as CnR such that the interior void of coil Cn is disposed between and in direct mechanical contact with the left branch CnL and the right branch CnR,
wherein there is no overlap between the branches of different coils of the N coils,
wherein the branches of the N coils are in an ordered sequence in the X direction of C1L, C2L, C3L, C1R, C2R, C3R, . . . , C(N-2)L, C(N-1)L, C(N)L, C(N-2)R, C(N-1)R, C(N)R,
wherein a first branch and a second branch of each two consecutive branches in the ordered sequence are positioned such that a minimum X coordinate of the second branch and a maximum X coordinate of the first branch are aligned in the Z direction to define an interface between the first and second branches.

15. The electronic card of claim 14, wherein for n=1, 2, . . . , N-1, said processor configured to generate the time varying magnetic field comprising:
said processor configured to ascertain that the card reader is in a spatial position that enables the readback signal to be induced in the card reader from the time varying magnetic field generated by the electrical current in a branch CnI (I=R or L) of the coil Cn; and
said processor configured to respond to having ascertained that the card reader is in the spatial position by being configured to operate the switch apparatus to electrically couple the two adjacent coils Cn and Ck, wherein the coil Ck has a branch CkJ (k=2, . . . N and J=R or L) placed right after the branch CnI in the X direction, to the power source and to electrically decouple all other coils of the N coils from the power source to cause the power source to drive the electrical current through the two adjacent coils Cn and Ck and through no other coil of the N coils.

16. The electronic card of claim 15, wherein said processor configured to operate the switch apparatus comprises said processor configured to electrically couple the two adjacent coils Cn and Ck to the power source in a manner that results in electrical currents in the branches CnI and CkJ of about equal magnitude and same direction with respect to a Y direction normal to both the X direction and the Z direction.

17. The electronic card of claim 11, wherein said processor configured to generate the time varying magnetic field comprises said processor configured to generate a finite time derivative of electrical current in each coil of the two adjacent coils at times when no finite time derivative of electrical current is logically required for generating the time varying magnetic field, and wherein a magnitude of the finite time derivative of electrical current does not exceed a specified maximum time derivative of electrical current corresponding to a peak voltage threshold ($V_{th}$) and an overshoot ratio (f) of the card reader.

18. The electronic card of claim 17, wherein the maximum time derivative is $f*(2I_0/\Delta t_{sw})$, wherein $I_0$ is a maximum electrical current that can be driven through each coil, and wherein $\Delta t_{sw}$ is a minimum switching time to change an electrical current through each coil from $-I_0$ to $+I_0$.

19. A method for processing data stored in an electronic card, said method comprising:
   accessing a sequence of binary bits, for each data track of at least one data track, from a memory of the electronic card;
   determining a time varying electrical current configured to flow in at least one wire disposed in each data track of the at least one data track to generate a time varying magnetic field that encodes the sequence of binary bits; and
   generating the time varying magnetic field as the card is swiped through a card reader in a minus X direction, said time varying magnetic field inducing a readback signal in the card reader;
   wherein the card comprises a substrate, a processor disposed in the substrate, the at least one data track disposed in the substrate such that each data track is oriented in a X direction, the memory disposed in the substrate, the at least one wire disposed in the substrate, and a power source disposed in the substrate,
   wherein the power source provides electrical power to the processor and the at least one wire,
   wherein said generating the time varying magnetic field comprises generating a voltage drop that drives the time varying electrical current through the at least one wire to generate the time varying magnetic field, and
   wherein said generating the time varying magnetic field comprises generating a finite time derivative of electrical current in the at least one wire at times when no finite time derivative of electrical current is logically required for generating the time varying magnetic field, and wherein a magnitude of the finite time derivative of electrical current does not exceed a specified maximum time derivative of electrical current corresponding to a peak voltage threshold ($V_{th}$) and an overshoot ratio (f) of the card reader.

20. The method of claim 19, wherein the maximum time derivative is $f*(2I_0/\Delta t_{sw})$, wherein $I_0$ is a maximum electrical current that can be driven through each wire, and wherein $\Delta t_{sw}$ is a minimum switching time to change an electrical current through each wire from $-I_0$ to $+I_0$.

* * * * *